United States Patent [19]

Briault

[11] Patent Number: 5,287,398
[45] Date of Patent: Feb. 15, 1994

[54] REMOTELY ACCESSIBLE SECURITY CONTROLLED AUDIO LINK

[75] Inventor: Nigel C. Briault, 6460 Gibbons Dr., Richmond, B.C., Canada, V7C 2C8

[73] Assignees: Nigel C. Briault; Diane F. Briault, both of Richmond; Floyd C. Marlatt; Frances R. Marlatt, both of Surrey, all of Canada

[21] Appl. No.: 795,037

[22] Filed: Nov. 20, 1991

[51] Int. Cl.[5] .......................................... H04M 11/00
[52] U.S. Cl. ....................................... 379/38; 379/102; 379/104; 379/105; 379/39
[58] Field of Search ................. 379/38, 39, 40, 41, 379/45, 51, 52, 102, 105, 104, 420, 388, 389, 386

[56] References Cited

U.S. PATENT DOCUMENTS

| | | | |
|---|---|---|---|
| 4,453,043 | 6/1984 | Zielinski et al. | 379/52 |
| 4,495,383 | 1/1985 | Lubin et al. | 379/52 |
| 4,527,015 | 7/1985 | Chambers et al. | 379/105 |
| 4,596,900 | 6/1986 | Jackson | 379/105 |
| 4,760,593 | 7/1988 | Shapiro et al. | 379/38 |
| 4,763,349 | 8/1988 | Siegel et al. | 379/38 |
| 4,771,450 | 9/1988 | Castro et al. | 379/386 |
| 4,841,562 | 6/1989 | Lem | 379/105 |
| 5,079,627 | 1/1992 | Filo | 379/53 |
| 5,237,602 | 8/1993 | Lazik | 379/38 |

FOREIGN PATENT DOCUMENTS

| | | | |
|---|---|---|---|
| 2606190 | 5/1988 | France | 379/38 |
| 0022470 | 2/1984 | Japan | 379/52 |

*Primary Examiner*—Jin F. Ng
*Assistant Examiner*—Stella L. Woo
*Attorney, Agent, or Firm*—Roy E. Mattern, Jr.

[57] ABSTRACT

The security for a person in a domicile, premise, or dwelling, is increased in the effectiveness thereof, by utilizing a remotely accessible security controlled audio link, which provides a hands free telephone answering system, that operates without the utilization of any conventional telephone located in the domicile. In a normal mode of this audio link, the telephone of a domicile is used in a conventional manner. However, when a telephone in the domicile is not answered within a time period of a designated number of rings, then the remotely accessible security controlled audio link operates to answer the incoming call by, in effect, functioning in an equivalent way, to lift up a conventional receiver, without the conventional receiver ever being raised. Thereafter, if a correct pulse tone entry code is entered by a person at a remote location, within a limited time period, telephone voice communications can begin and will continue between a person in or near the domicile and a person at a remote telephone location, thereby expanding the security available for a person in and around a domicile. Also if an alarm signal is initiated by a person in and around a domicile, then an alarm mode is established. Thereafter the remotely accessible security controlled audio link operates to bypass the privacy security features thereof, by eliminating the functions of both the ring counting delays and correct pulse tone entry codes, and instead functions to quickly establish telephone communications, while in this alarm mode of operations.

46 Claims, 13 Drawing Sheets

86 TABLE TOP            104 DOMICILE

86 TABLE TOP      104 DOMICILE

FIG. 8
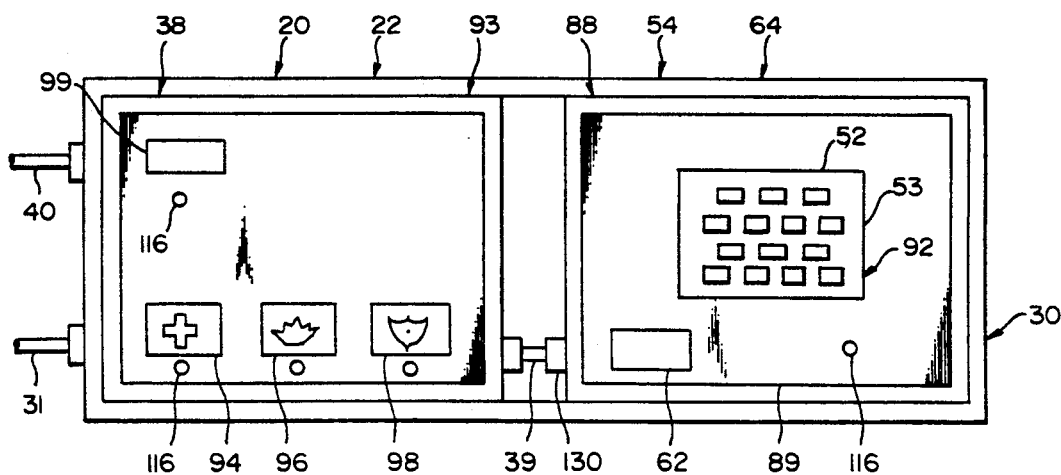
86 TABLE TOP
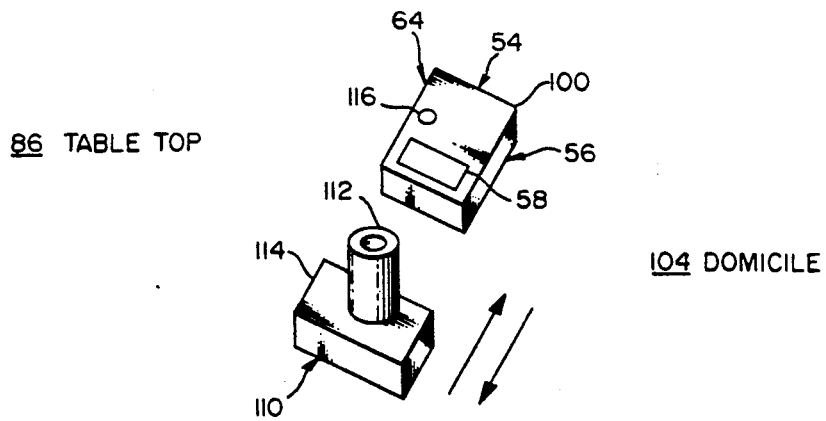
104 DOMICILE

REMOTELY ACCESSIBLE SECURITY CONTROLLED AUDIO LINK

BACKGROUND

In the past and continuing at this time, security systems have been and are being installed in domiciles, premises, or dwellings, to be activated in a domicile or nearby, to send a signal or signals from a domicile, via a telephone line or lines, to a remote or distant monitoring office or station at another domicile, premises, or dwelling. The signal, depending on what switch or button was finger manipulated, or otherwise triggered, results in selectively receiving assistance, respectively from medical personnel, fire fighting personnel, or law enforcement personnel. The signals otherwise triggered are generated, by way of example: when doors or windows are being opened; when motions are detected; when excessive noises occur; or when heat is detected by heat sensors.

Some of these security systems which are available today in the marketplace and are particularly directed to health care are:

An emergency health care system, identified as to its source by the trademark and/or service mark Lifeline, is described by quoting from a brochure as follows:

"How does Lifeline work?
1. When you need emergency assistance, just push the small, wireless button worn around the neck, on the wrist, or attached to your belt.
2. The button activates Lifeline's "home communicator", which is linked to your telephone.
3. Immediately, trained personnel at the Peace Arch District Hospital's Emergency Department are notified that you need help.
4. Emergency Department professional will call you to determine what kind of help is needed and will send an appropriate responder—a neighbor, relative, or other emergency assistance, such as an ambulance, to your home. Upon arrival, your responder pushes the "reset" button to let the Emergency Department know that help has arrived".

Another emergency health care system, identified as to its source by the trademark and/or service mark Medic Aid, is also described by quoting from a brochure, as follows:

"Easy to operate—A push of a button.
As Easy as 1, 2, 3 . . .
In the event of an emergency, the user simply depresses the button, triggering our programmed dialing system connected to your phone line.
An ambulance arrives at your residence within minutes to assist you in your emergency. Our business is saving lives, and we are happy to protect yours!

Other emergency health care systems identified as to their source by the trademarks and/or service marks Life Call, or Life Alert are similar in operation to Lifeline systems, and they are purported to have listen in capability.

SUMMARY

In and nearby domiciles, premises, or dwellings, security systems have been previously installed, selected from several embodiments available in the marketplace, which transmit signals from a domicile, via telephone lines, to a distant, remote, monitoring office or station at another domicile, premises, or dwelling. In the originating domicile, a respective selected key, button, or switch is finger manipulated to respectively send a signal to summon medical personnel, a signal to summon fire fighters, or a signal to summon police officers. To security systems, a remotely accessible security controlled audio link is now incorporated. Thereafter, the overall security system also includes a hands free telephone answering system, which operates without the utilization of any conventional telephone located in the domicile. Also this hands free telephone answering system provided by installing this remotely accessible security controlled audio link is installed independently. Such an installation is especially needed when the main concern of persons at a remote location is to be able to call in to check on the activities and health of a person living in a domicile, who may not be able to directly answer a conventional telephone.

In a normal mode of this overall security system, especially in reference to the normal mode of the components and circuitry of the remotely accessible security controlled audio link, the audio link is constantly in a listen in mode, while everything else is inactive, and the telephone or telephones of the domicile are used in the conventional manner, providing an incoming telephone call is answered, within the time period of a designated number of rings, or ring count. However, if the predetermined number of rings is exceeded, then the remotely accessible security controlled audio link operates to partially answer the incoming telephone call, by in effect functioning to lift up the receiver, without an actual telephone receiver ever being raised. However, a speaker and/or a microphone are not as yet connected.

Thereafter, this audio link creates a single low tone, such as a beep or boop sound, which tells, indicates, or advises the person initiating the telephone call at a remote location, that this incoming call has been answered. This remotely accessible security controlled audio link then waits for the possible entry of a pulse tone entry code, within a pre-specified time period or time frame, to be entered by the person, who is initiating the telephone call at a remote location. Then upon the receipt of the correct pulse tone sequence, this remotely accessible security controlled audio link becomes active, and turns on a microphone and/or a speaker, allowing voice communication to begin between the person making the telephone call at a remote location, and the person or persons who are answering, while being in or nearby the domicile, and who are often in need of assistance, and who must communicate in a hands free status. Upon completion of the communications, the person placing the telephone call at the remote place, terminates the telephone call connection, which otherwise would remain open, by entering a preselected pulse tone or tones. Upon recognizing this pulse tone or tones, the audio link operates to, in effect, hang up the receiver, which in reality had never been raised, and to place the regular telephone system back into normal operation, free from any interference with this audio link.

If on the other hand, the correct pulse tone sequence is not complied with and therefore not received within a predetermined time period in the domicile, then this remotely accessible security controlled audio link directly operates to in effect hang up the receiver.

In contrast, in the alarm mode, alarm state, or triggered mode, this remotely accessible security controlled audio link, directly responds to the actions of a person, in or nearby the domicile, who with his or her finger moves a control key, button, or switch to obtain the selected assistance needed. In so doing, this audio link operates to bypass both the functional requirement of the ring counting and the follow on functional requirement of the completion of a security code to gain communication access to the domicile, whether to talk, or to listen, or to both talk and listen.

Upon termination of this alarm mode, this remotely accessible security controlled audio link, returns to the normal mode thereof. Thereafter, upon the creation of a preselected security pulse tone, by a person at the remote location, the telephone system in the domicile is returned to the regular operational status thereof. In effect, the telephone hand held receiver is hung up, but in reality, the actual telephone hand held receiver had never been raised.

When a person, because of a previous illness or injury, does not have the physical capability of using a conventional telephone, nor even have the physical capability of finger manipulating a control key or button, then an air volume and pressure tube is provided in conjunction with a control key, tab, or button, so this person may blow into the air tube, to thereby actuate the control key, tab, or button.

Preferably, at least one control key or button is arranged within a small unit, which transmits a radio frequency signal, to be received by the remotely accessible security controlled audio link, and which is easily supported on a loop arranged about a person's neck, or on a clip placed on a person's belt. Also other control keys or buttons are preferably arranged with air tubes on another somewhat stationary larger triggering unit which is conveniently located in the domicile.

The remotely accessible security controlled audio link, which is capable of creating the communication periods of hands free telephone answering and talking times, also adds many capabilities to all overall security systems. Persons at remote locations are able to call in, via complying with the security codes, to determine how well a person in a domicile is doing in reference to his or her capabilities and health status. If the person fails to answer, when a receiver and a microphone are activated upon the remotely created pulse tone code, then help can be summoned very quickly to the domicile. Likewise, if the person answers and is distressed, then the needed specific help, which is requested by the person in the domicile, can be summoned very quickly to the domicile.

Also the remotely accessible security controlled audio link, which is capable of control by persons at a remote location, and which is also triggered at a domicile or at a specific business, or at a designated place, to create hands free telephone communications is therefore installed, for example, in homes, in commercial businesses, in underground parking lots, in other places, where a panic situation might develop, such as in elevators, in high rise buildings and in mine shafts. The triggering is done in various ways, for example, such as by a person, or a smoke alarm, or an infrared signal, or a completed or a broken circuit or a wrongful entry security system. In many of these installations, the rescue personnel are able to perform their respective tasks quicker and much better, when the remotely accessible security controlled audio link is available to complete a connection to listen and as necessary to speak, just as though a conventional telephone conversation was underway.

If the person who is distressed is not able to finger manipulate signal button or switches, he or she may, via the air tube, create sufficient pressure of an air volume in the tube to operate a button, tab, or switch, to create the alarm mode and immediately gain the hands free voice communication with the person at the remote location, who generally is a paramedic, so he or she can summon, if necessary, the needed trained personnel in reference to medical assistance, fire fighting assistance, or policing assistance.

The remotely accessible security controlled audio link combines or incorporates known components and their respective circuitry and parts. For example, a VOX component is used to poll or to roam from a speaker to a microphone, of this audio link, to ascertain a volume level, without incurring corruption or interference from the other microphone or speaker. Also a PIC 16 microprocessor chip component is used, which is software programmable. The program interprets electrical pulses, also referred to as actions, to then undertake predetermined reactions, such as an impulse, initiated by a person at a remote location is detected on one circuit to terminate a telephone connection, by in effect hanging up a conventional telephone receiver, which has never been raised. In addition, a DTMF decoder chip component is used, so the remotely accessible security controlled audio link is able to, in effect, constantly listen in to the incoming telephone line, and to search for pulse tones, being generated by a person at a remote location depressing the buttons on a telephone set in a remote location. Then the DTMF decoder chip component translates these pulse tones, in sequence, as electrical pulses, which are conducted to the PIC 16 microprocessor chip component to generate the reaction that is required.

DRAWINGS

Preferred embodiments of the remotely accessible security controlled audio link are illustrated along with other components and circuitry in the drawings, wherein:

FIG. 1 is a schematic overall composite perspective view looking down on a portion of a table top on which are arranged: on the right side, the remotely accessible security controlled audio link, which creates a hands free telephone duplex answering system, which can be initiated and terminated by a person at a remote location; on the left side, the ending portions of a telephone circuit and the ending portions of an electrical energy circuit, where both these circuits enter a power supply, which in turn is connected to the remotely accessible security controlled audio link; and in the center below, a compact remotely used radio frequency transmitter unit, carried by a person, for button actuation to initiate a signal, often a distress signal, to be transmitted to the remotely accessible security controlled audio link, to in turn start the operation of the hands free telephone duplex system, which can be terminated by a person at a remote location;

FIG. 2 is a schematic block and circuit diagram, illustrating in the upper portion of this figure: how the telephone circuit of a domicile is extended from a wall telephone jack thereof to a six pin connection jack of the remotely accessible security controlled audio link; how, from a 110 volt AC wall plug of the domicile, a 110 volt AC circuit is connected to an alternating current transformer, which changes the voltage from 100 volts AC to 12 volts AC; how a 12 volt DC power supply is connected via a circuit to receive 12 volts AC from the transformer, and after the conversion to 12 volts DC therein, the 12 volts DC electrical energy is delivered, via a circuit, to the same six pin connection jack of the remotely accessible security controlled audio link; and how an alarm triggering unit via a circuit is connected to the same six pin connection plug or jack of the remotely accessible security controlled audio link; and illustrating in the lower portion of this figure a surrounding rectangle, which represents the enclosure of this embodiment of a remotely accessible security controlled audio link; and showing schematically, within this represented enclosure, the internal principal components and circuitry of this embodiment, which include a ring count module, a dial tone modulated frequency decoder, i.e. DTMF decoder, a microprocessor, an amplifier which is preferably included, a microphone, and a speaker;

FIGS. 3, 4, 5, and 6 are block diagram schematics, including both legends and numerals, to illustrate how the remotely accessible security control audio link is used: first in FIG. 3, essentially to answer the telephone in a domicile, upon placement of a telephone call from a remote location, after a designated ring count and entry of a security pulse tone code to create a hands free telephone communications; second in figure 4, in addition beyond answering as shown in FIG. 3, to also, as shown in this FIG. 4, to be activated within the domicile, either a person operating a switch on an alarm trigger as shown in FIG. 2, or by depressing a button on a radio frequency transmitter as shown in this FIG. 4, which results in sending a signature signal over the telephone lines to a remote telephone location, where a person at this remote location can call back, bypassing the ring count and the security pulse tone codes, to establish the hands free telephone communications with the person in the domicile, who may be in a distressed situation needing the help of a person such as paramedics; third in FIG. 5, in addition, although answering as shown in FIG. 4, via the two different ways of the initial steps being taken, either at a remote telephone location, or within the domicile, the overall arrangement of all the related combined components and circuits, include an electronic telephone which is also a component of the usual domicile telephone equipment; and fourth in FIG. 6, in addition, although answering as shown in FIG. 4, via the two different ways of the initial steps being taken, either at a remote telephone location, or within the domicile, the overall arrangements of all the related combined components and circuits, include a selected embodiment of many embodiments of domicile security system base units, presently available in the marketplace, which are then enhanced, as a component of an overall domicile security system, to provide often needed hands free telephone communications initiated upon operating the remotely accessible security controlled audio link, in these FIGS. 3, 4, 5, and 6;

FIG. 7 is an overall composite schematic perspective view looking down on a portion of a table top on which are arranged: on the right side, the remotely accessible security controlled audio link, which creates a hands free telephone answering system, to provide hands free telephone communications; on the left side, a domicile security system base unit; in the center, a compact remotely used radio frequency transmitter unit, to be carried by a person, for button actuation to initiate a signal, often a distress signal, to be transmitted to the remotely accessible security controlled audio link, to in turn start the operation of a hands free telephone communications or system; and an air tube accessory to be inserted over the compact remotely used radio frequency transmitter unit, when necessary, permitting a person to blow through the air tube to deflect the button, thereby starting the radio frequency transmission of a signal to the remotely accessible secured controlled audio link, resulting in turn in the operation of a hands free telephone communications or system extending between a person at the domicile and a person at a remote telephone location;

FIG. 8 is an overall composite schematic perspective view looking down on a portion of a table top on which are arranged: an overall enclosure, with the cover removed, representing a combination of the enclosed components of a domicile security system base unit, and the enclosed components of a remotely accessible security controlled audio link, the latter serving to provide hands free telephone communications; a compact remotely used radio frequency transmitter unit, to be carried by a person, for button actuation to initiate a signal, often a distress signal, to be transmitted to the remotely accessible security controlled audio link, to in turn start the operation of a hands free telephone communications or system; and portions of a domicile telephone circuit and portions of an electric energy supply 12 volt DC circuit, previously derived via the domicile 110 volt AC circuit, changed to 12 volt AC circuit in a transformer, not illustrated, and then converted in a power supply to a 12 volt DC circuit connected to this combination of components;

FIG. 9 is a schematic block diagram presenting components and their locations and electrical energy communication paths between them, such as telephone lines and radio frequency transmissions, with the components presented in the top area of this FIG. 9, being located in a domicile or nearby it where a person or persons live who may need or need assistance, and with remaining components presented in the bottom areas of this FIG. 9, being located at a remote monitoring station and beyond in respect to an embodiment of an overall domicile security system capable of establishing hands free duplex telephone communications which can be initiated and terminated by a person at a remote location;

FIG. 10 is a schematic view of the assembled components of an embodiment of the remotely accessible security controlled audio link arranged within an enclosure and on a printed circuit board, as they appear, after a cover of the enclosure has been removed;

FIG. 11 is a circuit diagram of an embodiment of the remotely accessible security controlled audio link, which serves as the basis for establishing hands free telephone communications, and because of the need to increase the readability of this circuit diagram, it is presented, enlarged, throughout FIGS. 12, 13, 14 and 15, making the legends, standard industry part numbers and letters, and the reference numerals and lead lines more readable;

FIGS. 12, 13, 14, and 15, together, when overlapped and related to one another, illustrate again the circuit diagram of the remotely accessible security controlled audio link first shown in FIG. 11, whereby the legends, standard industry part numbers, and the reference numerals and lead lines are all of a size to be conveniently read.

DESCRIPTION OF THE PREFERRED EMBODIMENT

Figure 1:
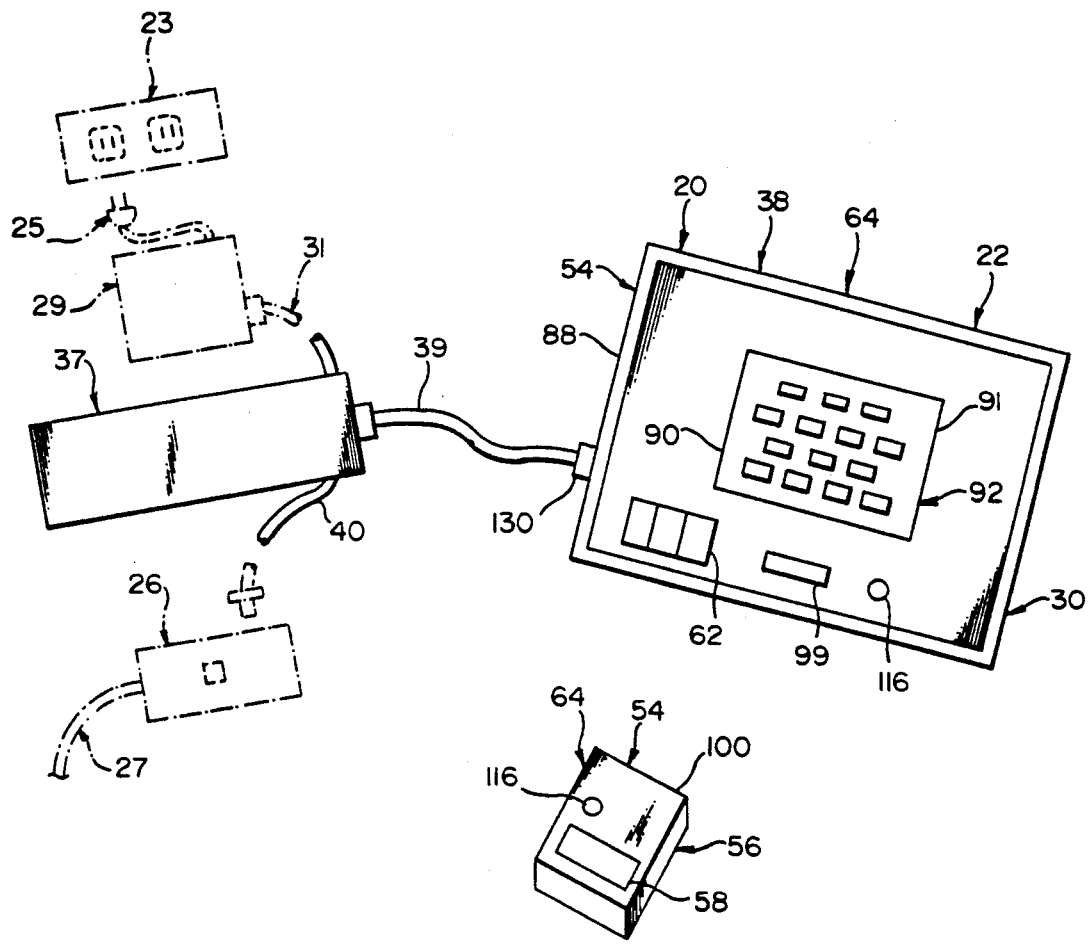

Introduction—The Establishment of a Hands Free Telephone Answering System Providing Hands Free Duplex Telephone Communications Which Can be Initiated and Terminated by a Person at a Remote Location As illustrated in the drawings, the remotely accessible security controlled audio link 20, when used in conjunction with a domicile telephone system 26, and when together they function over telephone utility lines 27 with remote telephone system 28 located at a distant location, there is created, a hands free telephone answering system 30, providing hands free telephone communications, which operates without the utilization of any conventional pulse tone telephone 32 located in the domicile 24.

This created hands free telephone system is a duplex system, which can be initiated and terminated, in respect to its active communicating or listening, or speaking times, by a person at a remote location.

The Modes of Operation of the Remotely Accessible Security Controlled Audio Link in Respect to Creating the Hands Free Telephone Answering System Providing Hands Free Telephone Communications There are two modes of operation, the normal mode and the alarm mode, of the remotely accessible security controlled audio link 20, as illustrated and described in respect to the preferred embodiment 22, and other embodiments thereof, which all, when needed, become a hands free telephone answering system 30, which in turn establishes a needed two way hands free telephone communication between a person in a domicile 24, and a person located at a remote telephone location 34, who is using a pulse tone conventional telephone 32, or other pulse tone telephone equipment.

In the normal mode of this remotely accessible security controlled audio link 20, the pulse tone conventional telephone 32 of a domicile 24 is used in a conventional manner, while this auto link 20 stays constantly in the listening in mode. However, when this telephone 32 in the domicile 24, is not answered within a time period of a designated number of rings being listened to in the listening in mode, then the remotely accessible security controlled audio link 20 operates to partially answer the incoming call by, in effect, functioning in an equivalent way, to lift up a conventional receiver 33, without the conventional receiver 33 ever being raised above the base 35, of the telephone set 36 of the pulse tone conventional telephone 32, or of another pulse tone telephone set. Thereafter, if a correct pulse tone entry code is entered by a person at a remote telephone location 34, within a limited time period, as being listened to by this audio link 20, then it operates to complete the telephone call, and the telephone voice communications can begin and will continue between a person in or near the domicile 24 and a person at a remote telephone location 34, thereby expanding the security available for a person in and around a domicile 24. When such a needed call is over, a person at the remote location can terminate the call, in effect hanging up the receiver.

In the alarm mode of this remotely accessible security controlled audio link 20, if an alarm signal is initiated by a person in and around a domicile 24, then the remotely accessible security controlled audio link 20 operates to bypass the privacy security features thereof, by eliminating the functions of both ring counting delays and pulse tone entry codes, and instead functions to quickly establish hands free telephone communications, while in this alarm mode of operations, between the person in a domicile 24 and a person at a remote telephone location 34. When such a needed call is over, a person at the remote location can terminate the call, in effect hanging up the receiver.

The Utilization of the Remotely Accessible Security Controlled Audio Link for Creating Only a Hands Free Telephone System. Per Se In embodiments, illustrated in FIG. 3, of the remotely accessible security controlled audio link 20, it is essentially operated by itself in the domicile 24, to provide a hands free telephone system 30 per se providing hands free duplex telephone communications, which can be initiated and terminated by a person at a remote location. Such embodiments make it possible, for a person caring for another person in their domicile 24, or a person, not living in the domicile 24, who is concerned about the health of a person living in the domicile 24, for either of these persons, when they are away from the domicile 24, to place and to complete a telephone call to the person who is living in the domicile 24 to determine, if they are all right, or if they require care.

Figure 3:
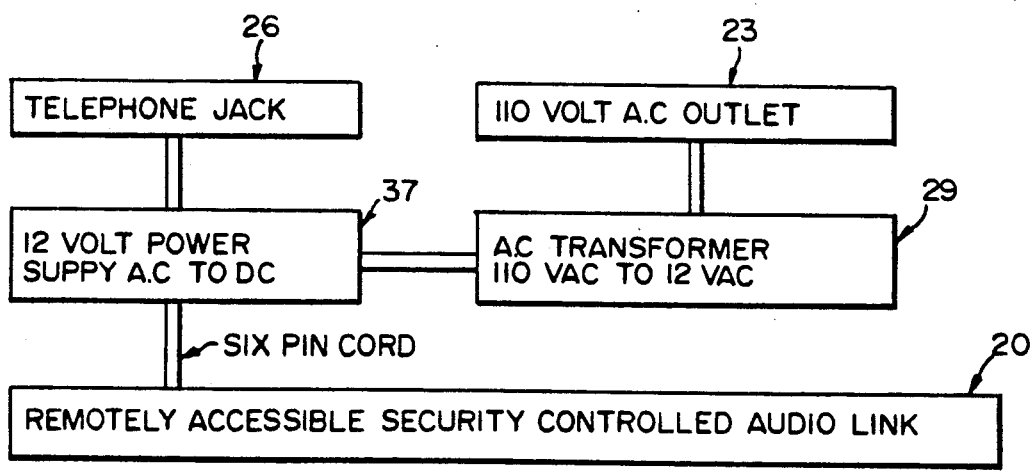
Figure 4:
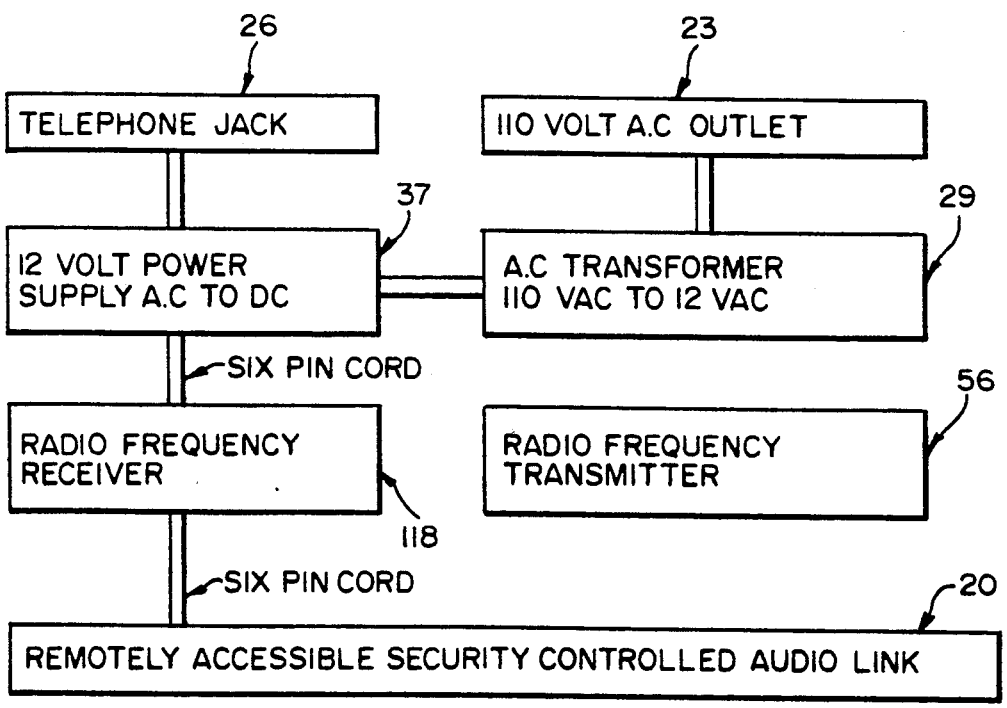
Figure 5:
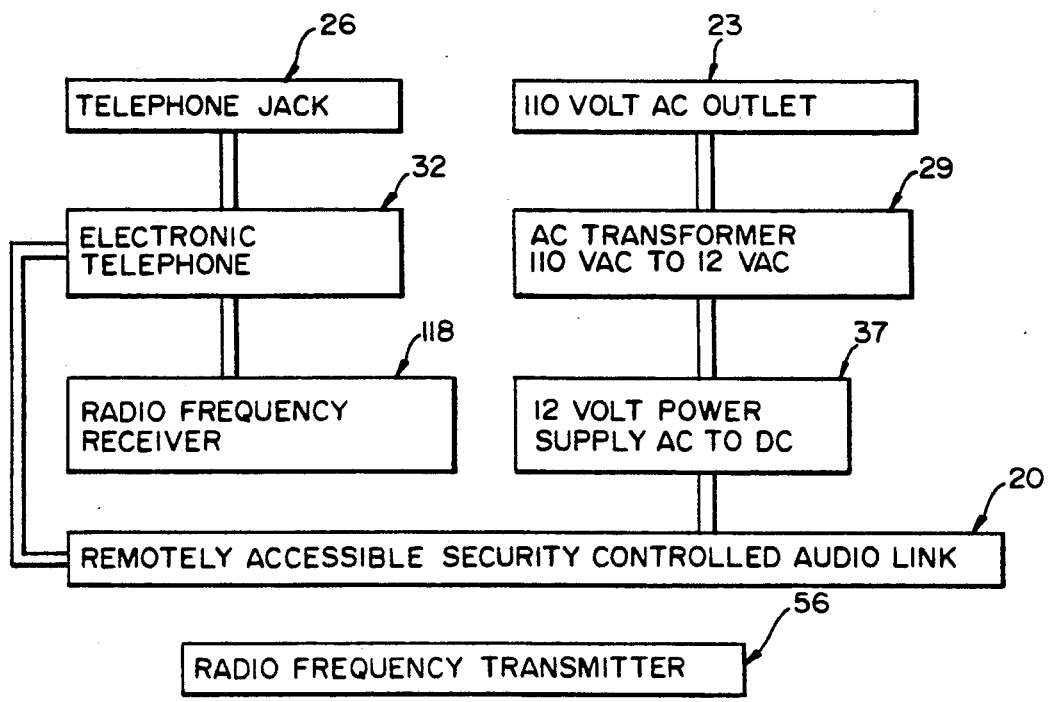

In this FIG. 3, a wall receptacle 23 of the domicile is shown, where electrical utility 110 volt AC electrical energy is supplied, through a 110 volt AC circuit 25 to an alternating current transformer 29, changing the 110 volt AC to 12 volt AC electrical energy. Thereafter, a 12 volt AC circuit 31 conducts this electrical energy to a 12 volt power supply, which produces 12 volt DC electrical energy. Also this power supply 37 is connected to telephone line 40 in the domicile 24, and it is also connected, via a six conductor connection cord 39, to the remotely accessible security controlled audio link 20.

The Utilization of the Remotely Accessible Security Controlled Audio Link With or in a Break in Monitoring System In another embodiment, as illustrated in FIGS. 1 and 3, of the remotely accessible security controlled audio link 20, only portions of an otherwise full hands free telephone answering system 30 may be utilized. This is true because the only objectives are to either activate a microphone 52 in the domicile 24 or to activate both a microphone 52 and a speaker 53, when, for example, it is known or it is believed a crime, such as robbery, is being committed. Preferably, the sound picked up by the microphone 52 at a remote telephone location 34, generally located in a remote monitoring station 42, will be recorded to be used as evidence in a criminal legal proceeding.

The Utilization of the Remotely Accessible Security Controlled Audio Link in a Noise Level Monitoring System, for Example, Used in a Hotel or Motel In another embodiment, as illustrated in FIGS. 1 and 3, of the remotely accessible security controlled audio link 20, only portions of an otherwise full hands free telephone answering system 30 are utilized. This is true, because the only objective, generally, for example, in respect to hotel and motel management, is to activate a signal to be seen and/or to be heard in a room and/or microphone 52, when a noise level exceeds a preset limit of decibels in a room. If this occurs, the guests of the room or rooms are called to their respective room telephones, so they may hear a request from the manager or member of the staff of the hotel or motel, to reduce the noise level, so the other guests will no longer be disturbed.

The Utilization of the Remotely Accessible Security Controlled Audio Link in a Personal Emergency Response System Initiated Upon Depression of a Button on a Remote Wireless Transmitter Worn on a Person As shown in FIGS. 1, 4, 5, 6, 7, 8, 9, 10, 11, 12, 13, 14, and 15 of the drawings, by incorporating a remotely accessible security controlled audio-link 20, a personal emergency response system 54 is available, to be activated by a distressed person, when he or she may be unwantedly confined away from a domicile conventional telephone 32 and/or another type of personal emergency response system following a fall, heart attack, or other serious setback. He or she will be wearing a remote radio frequency, i.e. R.F., wireless transmitter 56 having a button 58 to be pressed by him or her to activate this transmitter 56, thereby sending a R.F. signal to a domicile or into a domicile of this person, which triggers many responsive signals, via the combined operation of a base unit 38 and the remotely accessible security controlled audio link 20 in his or her domicile 24, eventually securing two way duplex telephone line transmissions of both signals and voice messages, between the distressed person's locale and a remote monitoring station 42 or a remote telephone location 34, where persons, preferably paramedics, are on duty, to talk to the distressed person via a speakerphone 50 of this audio link 20, located in the person's domicile 24. Thereafter whatever aid is needed is quickly undertaken. The domicile telephone lines 40 and the utility telephone lines 27 will be utilized.

When an initial personal coded signal, created upon operation of the base unit 38 and the remotely accessible security controlled audio link 20, is received, over the telephone lines 40 and 27, at the remote monitoring station 42, via a digital signal receiver 44, the personal coded signal is directed on to a computer 46 at this remote monitoring station 42. Upon operation of this computer 46, the distressed person's medical history is presented on a display screen 48 for review of the paramedic, who then may be able to instruct the distressed person in helpful ways.

If the distressed person needs the help of other persons, such as paramedics, doctors, nurses, firemen, policemen, etc., and often also an ambulance or other response vehicle and the operators thereof, these needed assisting persons will be called by the personnel, preferably paramedics, located at the remote monitoring station 42.

At this time, if possible, the medical history of the distressed person will be faxed to the personnel, who soon will be arriving to assist the distressed person in his or her dwelling, or domicile 24 where he or she has had a serious mishap. Having read the faxed medical history the assisting personnel, on arrival, are better prepared to assist the distressed person.

In providing this conveniently activated personal emergency response system, often referred to as a P.E.R.S. system, which utilizes the remotely accessible security controlled audio link 20, the utilization of several embodiments and many selected respective components of them are undertaken, depending on the wanted performance to be attained. However, all the embodiments center on starting a call for help by pressing a single button 58 on a remote wireless transmitter 56 carried by a person in distress, or otherwise kept closely by her or him; or by pressing a button 60 on a base unit 38; or by pressing a button 62 on the remotely accessible security controlled audio link 20, which creates, via the functioning of the base unit 38, or the combined functioning of a base unit 38 and the remotely accessible security controlled audio link 20, their personal signature signal, which is sent over the telephone lines 40 and 27. Then this signature signal is received, and accurately processed, by computer 46 at a remote monitoring station 46, thereby leading to the establishment of duplex voice speakerphone 50 communications between the distressed person at a domicile 24, and a person, preferably a paramedic, at the remote monitoring station 46, if the distressed person is able to speak. If not, the transmitted signals will directly lead to telephone calls being made by the person, preferably a paramedic, at the remote monitoring station 46, to request other persons to go, as quickly as possible, to the aid of the distressed person in or nearby the domicile 24. If the person in the domicile 24 is able to coherently converse with the paramedic at the remote monitoring station 42, and relate his or her specific needs, then persons having specific training will be summoned to the domicile 24 of the distressed person. When the domicile telephone line is no longer needed, the person at the remote station can terminate the duplex calling period. In effect, a person at a remote location can, indirectly, lift up and lower a telephone receiver in the domicile, as the remotely accessible security controlled audio link 20 operates.

Utilization of Components, Units. Circuitry. Already Available in the Marketplace and Often Already Installed in a Domicile and/or in a Remote Monitoring Station As noted previously, security systems have been and still are being offered in the marketplace and installed in domiciles and in a remote monitoring station. Therefore various embodiments of the remotely accessible security controlled audio link 20, designated in the figures of the drawing, are made available to include or exclude components, units, and/or circuitry, depending on specific installations, involving no utilization of other prior installed components, units, circuitry, or involving some or many of them. This is true, for example, when a pre-existing domicile security system already has a base unit 38, in turn having a 12 volt DC power supply 37, a microprocessor 68, a digital alarm dialer 69, and the finger depressible buttons, such as the red cross button 94, the flame button 96, and the blue badge button 98.

Figure 9:
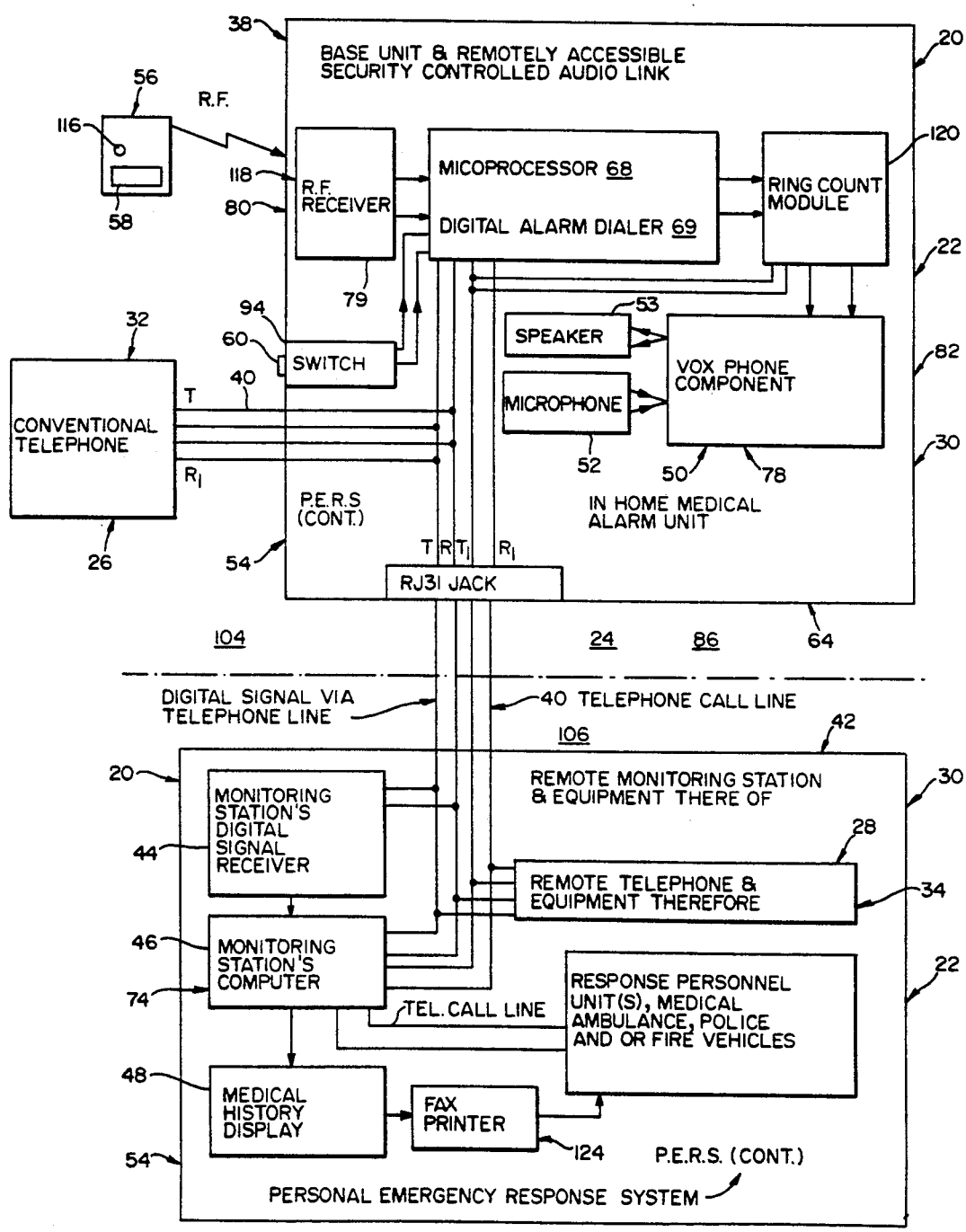

Therefore, throughout the figures of the drawings and throughout the descriptions some seemingly appearing inconsistencies may be noted. However, this impression or these impressions may occur because the prior available and/or prior installed components, units, circuitry, already contain components, units, circuitry needed for the full utilization of the remotely accessible security controlled audio link 20, as indicated in FIG. 9. This is especially true when the remotely accessible controlled audio link 20 is to be added to presently utilized personal emergency response systems, to provide the additional important feature of hands free duplex telephone communications. Also in so providing these duplex telephone communications, this audio link 20 makes it possible for the person at the remote location to both initiate and terminate a necessary call, in effect, without raising or lowering a telephone receiver. The existing components, units, circuitry already installed in a remote monitoring station 42, for example, include, as also illustrated in FIG. 9, a digital signal receiver 44, a computer 74, medical history display 48, fax printer 124, remote telephone system 28 and remote telephone location 34.

A More Detailed Description of the Remotely Accessible Security Controlled Audio Link When Used in or Extended to Become a Personal Emergency Response System As shown in FIG. 1 and in FIGS. 4 through 15, an in-home medical alarm unit 64 centers on the utilization of a remote wireless transmitter 56 that is worn on a person who, for one or more reasons, may need to seek help from care providers in a hurry, when he or she may find himself or herself in an emergency situation, when he or she needs access to a conventional telephone 32, but he or she is not able to reach a telephone 32, or to operate a telephone 32 to ask for help.

When help is needed, the then disabled and/or distressed person depresses a button 56 on the remote wireless transmitter 56 being worn by her or him, to cause the transmission of a radio frequency signature signal in or nearby his or her domicile 24. A base unit 38, of the in-home medical alarm unit 64, conveniently located in the domicile 24 of the distressed person receives this signature signal and quickly initiates an alarm sequence or an alarm mode of the remotely accessible secured controlled audio link 20. In this alarm sequence or mode, an alarm dialer portion 68 of the base unit 38 operates to in effect seize control of the dwelling telephone line 40, and thereafter sends a digital signal, via this telephone line 40, and the telephone utility lines 27 to a predetermined remote monitoring station 42, or to a remote telephone location 34.

At this remote monitoring station 42, there is a digital signal receiver 44, which decodes the received digital signal. In so doing, the service account code of the disabled person is determined. Then this service account code is utilized to trigger the activation of the account software. Thereafter, on the display screen 48 of a computer assembly 74 the disabled person's medical profile is presented for review by a person, preferably a paramedic. These operations occurring at the remote monitoring station 42, are like operations being performed in the past, and still being performed today using equipment already available in the marketplace.

Simultaneously, a telephone call is made back to the disabled person's base unit 38 of his or her in-home medical alarm unit 64. Upon operation of this base unit 38, initiated by this return call, the disabled or distressed person's telephone line 40 is released from the microprocessor 68 and the digital alarm dialer 69, and connected to the remotely accessible controlled audio link 20, and the speakerphone 50 thereof, which is the assembly of the microphone 52 and the speaker 53. Via these connections, hands free telephone communications may be started in the domicile 24 to answer the incoming call from the person, preferably a paramedic, located at the predetermined remote monitoring station 42. The incoming call is amplified to be heard by the disabled person in her or his domicile, and she or he, in a hand free way, can talk, if at all possible to do so, with the paramedic, utilizing the base unit 38 and the remotely accessible security controlled audio link 20, in the domicile 24, the domicile telephone line 40, the telephone utility lines 27 and the remote telephone equipment 28 installed in the predetermined remote monitoring station 42.

The paramedic takes whatever action may be necessary, following the conference with the disabled person, providing information over the telephone lines 27, 40, sending persons to aid the disabled person, and/or sending a fax to these aiding persons regarding the medical history of the disabled person, etc. If the speakerphone 50 is operating, but no response is heard by the paramedic, he or she will immediately send persons to the domicile 24 of the distressed and/or disabled person, who may not be able to communicate because of their injury or illness. In this way all this equipment operates as an excellent personal emergency response system 54, which is often referred to as P.E.R.S., which has this hands free duplex telephone communication capability, which can be initiated and terminated by a person at a remote location.

The Remote Radio Frequency Wireless Transmitter Worn by a Person

The preferred remote radio frequency wireless transmitter 56 worn by a person in her or his domicile 24 broadcasts on preselected megahertz band, such as on a 313 MHz band. The housing of this transmitter is designed to be water resistant to avoid or to minimize any moisture damage to the interior printed circuits and other components. This transmitter 56 is powered by the direct current energy supplied by utilizing a twelve volt direct current battery. The transmitter has an effective line of sight range of seven hundred feet selected from a possible range span of 300 to 3000 feet. This transmitter 56, incorporates components and circuitry, referred to as EE Prom technology used in conjunction with a radio frequency receiver 118, whereby they together establish their own compatible response signature, from a possible combination of one million variables. Thus the happening of any second transmitter broadcasting on the same frequency is virtually ruled out.

Figure 6:
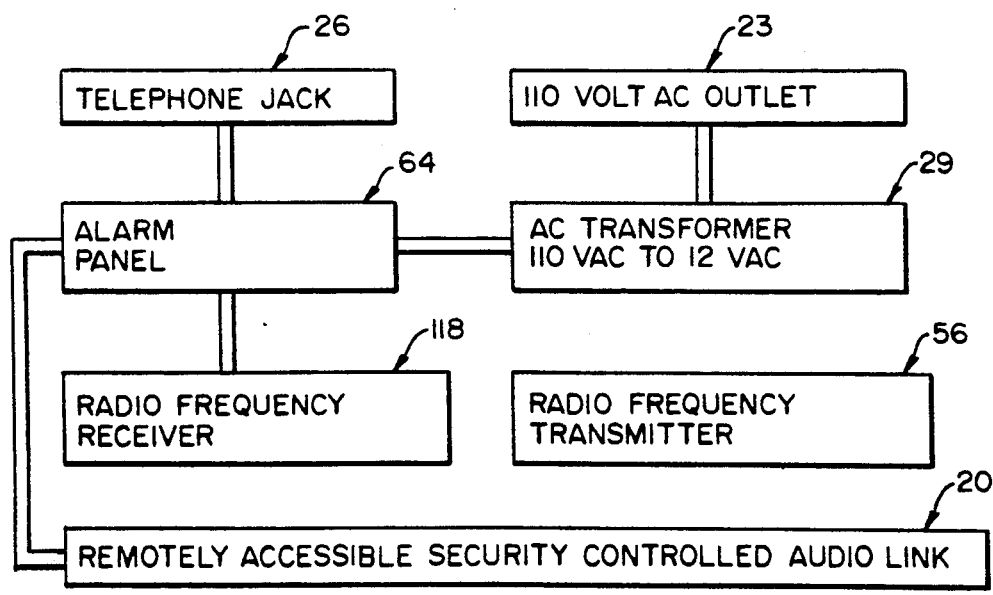
Figure 7:
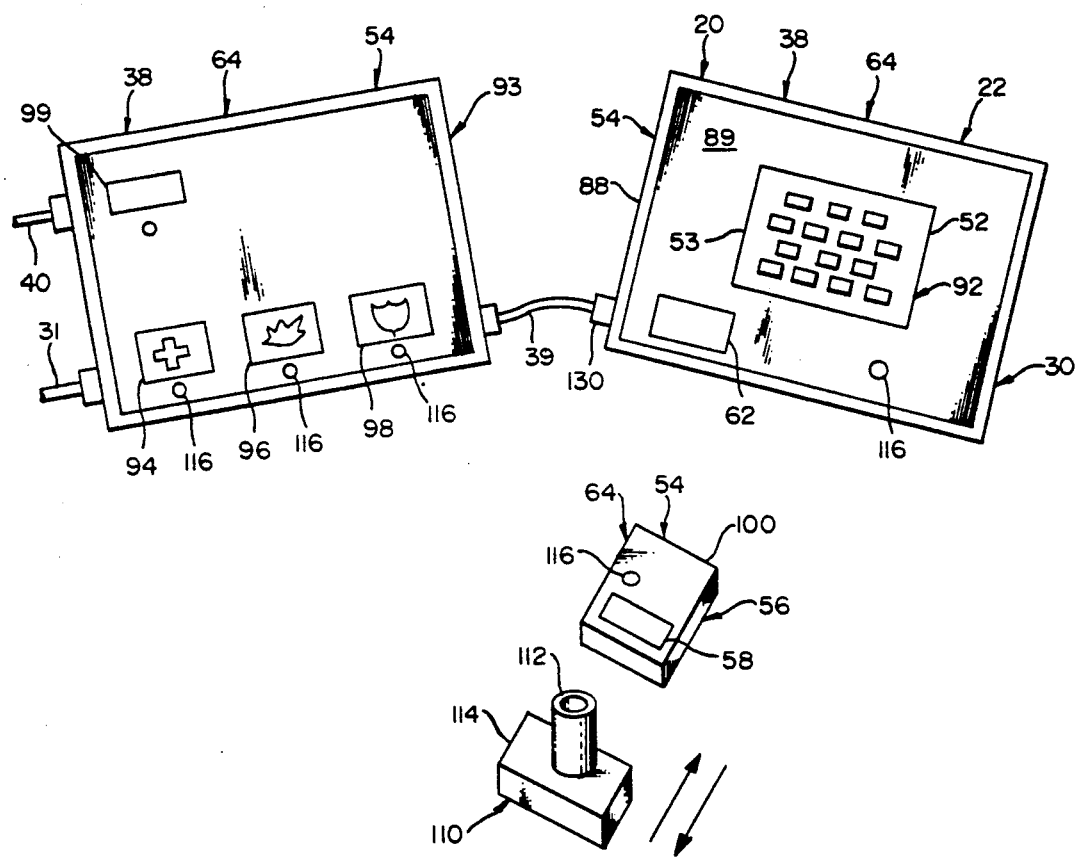

The Base Unit Located in the Domicile Where the Person Wears the Remote Radio Frequency Wireless Transmitter The base unit 38, as shown in FIGS. 6 and 7, is another component of the in-home medical alarm unit 64 of the overall personal emergency response system 54. This base unit 38 has the components and circuitry generally available in most security systems utilized previously and today in conjunction with remote monitoring stations 42 having personnel serving persons in many domiciles. It has components and circuitry arranged in a relay configuration 79 to receive a distress signal from a radio frequency wireless transmitter 56 worn by a distressed or disabled person in and around his or her domicile 26, or to receive a like signal resulting from the depression of a selected button on the base unit 38, which sends a signature signal to the remote monitoring station 42. Thereafter, when a person at the remote monitoring station 42 places a return call, the remotely accessible controlled audio link 20 operates to establish the hands free duplex telephone communications, which he or she can also terminate at the remote location.

Or, as illustrated in FIGS. 8 and 9, an overall combination unit 84 has two sections. The first section 80, briefly referred to as the relay section 80, receives the distress signal from the R.F. wireless transmitter 56 which is worn and operated by the distressed or disabled person, as she or he moves in and around his or her domicile 26 and operates to place a telephone personal signal message in the remote monitoring station 42. The second section 82, is an embodiment of the remotely accessible controlled audio link 20, which receives telephone messages from a person at the remote monitoring station 42, and from the distressed or disabled person in his or her domicile 24, and thereby establishes the hands free telephone answering system 30, establishing the capability of hands free duplex telephone communications, which can be determined by a person at the remote location.

Regarding Arrangements of Components Directly Used by a Person in a Domicile of the Remotely Accessible Security Controlled Audio Link, When Used in or Extended to Become a Personal Emergency Response System As illustrated in FIGS. 6, 7, 8, and 9, there are components, arranged on a table top 86, which, in FIGS. 7 and 8, in two embodiments, represent the minimum components to be handled by a person in his or her domicile 24, in respect to the remotely accessible security controlled audio link 20, when used in or extended to become a personal emergency response system 54. On the right side of this FIG. 7, most of the essentials of the remotely accessible security controlled audio link 20 are illustrated, as being in the speaker-like enclosure 88, having the speaker 53 and microphone 52 covered portion 92. On the left side of this FIG. 1, most of the essentials of earlier provided security systems, previously available and still available in the marketplace regarding medical help, fire fighting and/or police aid or protection are illustrated, as being within the enclosure 93 of the base unit 38, which may include added components to create the overall remotely accessible security controlled audio link 20, and the personal emergency response system 54. Optionally, as shown in this FIG. 7, the base unit 38 and the enclosure 93 thereof serve to position the three standard buttons to be selectively depressed by a person in a domicile 24, to summon respectively: by depressing the red cross insignia button 94, medical help; by depressing the red flame insignia button 96, fire fighting help; and by depressing the blue badge insignia button 98, police protection help.

Also shown in FIG. 7 temporarily positioned on table top 86 is the remote radio frequency wireless transmitter 56 arranged in the small compact enclosure 100, and positioning a button 58, which is temporarily depressed by a person in the domicile 24, to initiate immediately the alarm mode of the remote accessible security controlled audio link 20, to quickly establish the opportunity for hands free duplex telephone communications between the person in the domicile 24 and a person at a remote telephone location 34, and/or at a remote monitoring station 42.

Preferably, the person in the domicile 24, will keep the compact enclosure 100 of the remote radio frequency wireless transmitter 56, also referred to as the R.F. transmitter 56, with her or with him at all times, supporting the enclosure 100, by a clip, not shown, on a belt, or by a necklace-like support, not shown. In this way, wherever she or he may be in a domicile 24 or nearby the domicile 24, she or he may depress the button 58, to start the alarm mode to quickly get hands free telephone communications underway and/or get the assistance of other persons, to minimize the effects of any disaster, to prevent a disaster, or just to get needed communications underway.

Preferably, other portions of the remotely accessible controlled audio link 20 in their respective speaker-like enclosure 88, thereof, will be located in different places throughout and/or about a domicile 24, to insure that a person living in a domicile 24 will be able, if still alert enough, to communicate during a hands free duplex telephone communication period, no matter where she or he may be in the domicile 24, or nearby the domicile 24.

In addition, as shown in FIG. 7, an important accessory is illustrated, which is an air pressure tube assembly 110, giving the person in a domicile 24 the ability to depress the button 58 on the remote radio frequency wireless transmitter 56 by blowing air into the tube 112, which extends upwardly over the button 58, while in turn positioned by the preferably integral sleeve-like body 114 of this air pressure tube assembly 110. This air pressure capability is especially useful for a person who is not able to move his or her fingers at all, or without the needed control to properly depress the button 58 on the R.F. transmitter 56. Like purpose air pressure tube assemblies 110 singly or combined, not shown, are also selectively installed respectively over red cross insignia button 94, red flame insignia button 96, and blue badge insignia button 98, which are generally positioned on the base unit 38 of the in-home medical alarm unit 64.

Preferably a colored light appears at lens 116 on the compact enclosure 100 of the remote R.F. wireless transmitter 56, when the button 58 has successfully depressed by air pressure, or finger force. Preferably such a colored light appears at other lens 116 located wherever a switch or button is positioned such as the buttons 94, 96, and 98 on the base unit 38. Also, preferably, on each enclosure 88, 93, or a combined enclosure 102, as shown in FIG. 8, respective cancel buttons 99 are available to depress, as soon a possible, if a wrong button has been depressed, to cancel the wrong signal, and then anew to send a correct signal, if a signal still must be sent.

Placement of All Components. in One Combined Enclosure. to be Used Directly by a Person in a Domicile. of the Remotely Accessible Security Controlled Audio Link. When Used in or Extended to Become a Personal Emergency Response System In FIG. 8, a combined enclosure 102, is arranged to position all of the components and circuitry of a personal emergency response system 54, which incorporates the remotely accessible security controlled audio link 20, to thereby add the very important capability of creating hands free telephone communications, which can be initiated and terminated by a person at a remote location.

Figure 2:
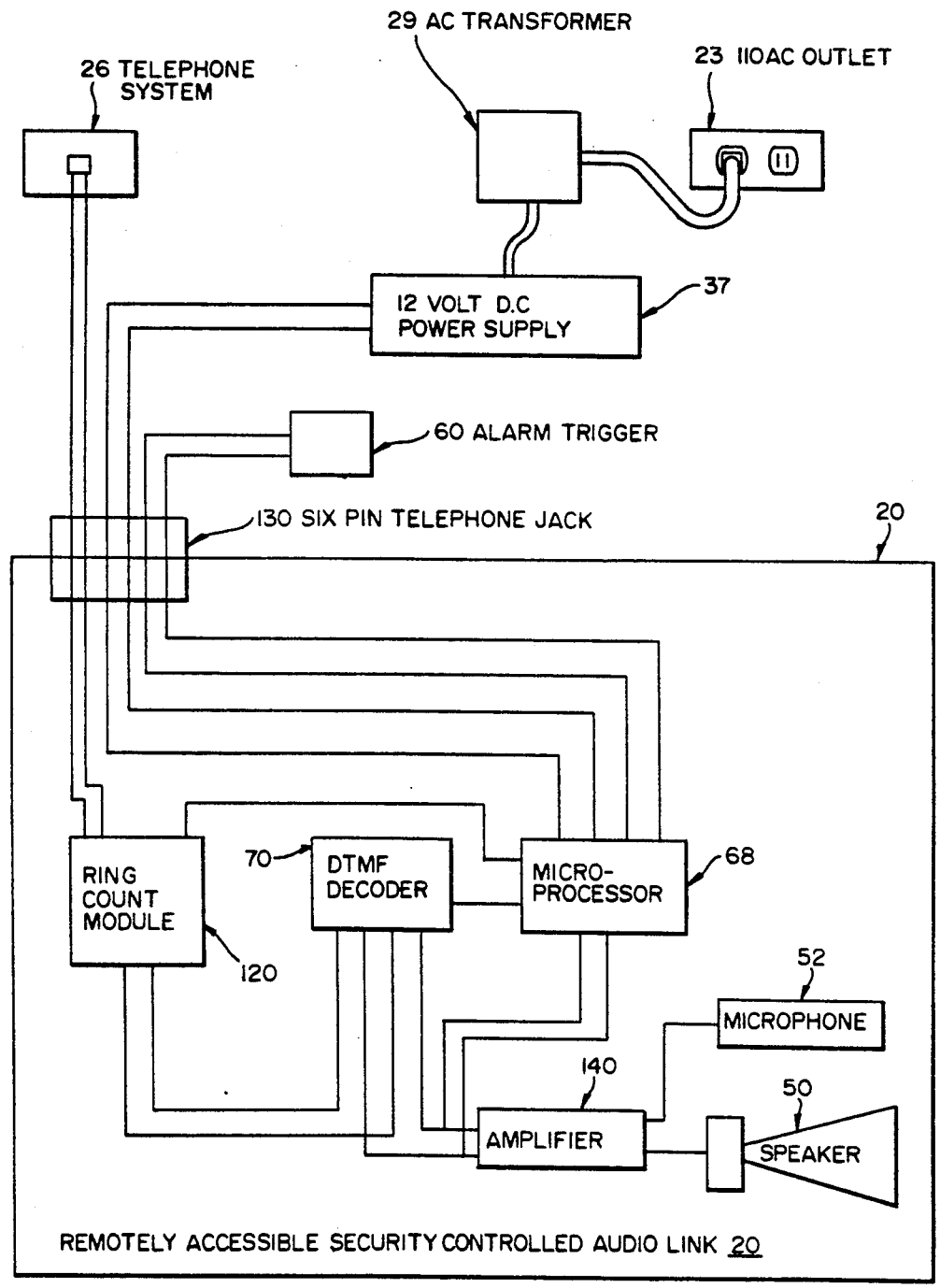

Regarding the Overall Arrangements of Components. Equipment, Circuitry, Telephone Lines. Communication Paths Between a Domicile and a Remote Monitoring System When a Personal Emergency Response System Includes a Remotely Accessible Security Controlled Audio Link Creating Hands Free Duplex Telephone Communications Illustrated in the schematic block diagram of FIG. 9, in the top area of this FIG. 9, above the phantom line, are the components, equipment, circuitry, telephone lines, and/or communication paths located in and about a domicile 24, where a person or persons live who may need assistance or immediately need assistance. In the bottom area of this FIG. 9, below the phantom line, are the components, equipment, circuitry, telephone lines, and/or communication paths located in and about a remote telephone location 34, which is generally located, in turn, in a remote monitoring station 42. Between these top and bottom areas of this FIG. 2, the domicile telephone line 40, or lines 40, and the telephone utility lines 27 are illustrated to schematically connect the domicile locale 104 with the remote telephone locale 106, and the latter is generally where the remote monitoring station 42 is located. The telephone lines 27 and 40 are arranged in side by side circuits noted in FIG. 9 by T.R. and $T_1.R_1$. In this way the digital alarm signals, and other non voice signals are separated from the voice signal sounds of the hands free duplex telephone answering system 30.

In reference to FIG. 9, the person in the domicile 24 who wishes to start a hands free telephone call and/or start the functions of a personal emergency response system 54, presses the button 58 on the remote radio frequency wireless transmitter 56, which he or she is carrying with him or her in the domicile 24 or nearby the domicile 24. An indicator light appears at lens 116 thereof, to indicate the button has been successfully depressed to start the operations of this system 54, whether it be only to gain hands free duplex telephone communications, provided by the remotely accessible security controlled audio link 20, or go beyond to also include other functions of an entire personal emergency response system 54.

If a person is handicapped and not able to finger manipulate the button 58 on the remote radio frequency wireless transmitter 56, he or she will then be using the air pressure tube assembly 110, shown in FIG. 7.

The radio frequency wave energy signals, often referred to as R.F. signals, are received by the radio frequency receiver 118 located in either the base unit 38 and/or the remotely accessible security controlled audio link 20 and/or the combined enclosure 102 of all the components, depending on the specific arrangement of an in home medical alarm unit 64 of the personal emergency response system 54, often in writings designated as P.E.R.S. From the R.F. signal receiver 118, the signals are directed to the digital alarm dialer 69 of the microprocessor 68 which has been used and still is used in all prior P.E.R.S. When initial signal is caused by a person using the R.F. transmitter 56, the ring count module 120, and security code pulse monitor components of the DTMF decoder 70 are by-passed in what is called the alarm mode of the remotely accessible security controlled audio link 20. They are not by-passed when no alarm signal has occurred, and someone at a remote telephone location 34 and/or at a remote monitoring station 42 is trying to call in, thereby establishing the security control of any attempted incoming telephone calls.

The person in the domicile 24 optionally may depress the button 60 on an enclosure, to operate switch 94 to in turn commence the operations of the digital alarm dialer 69 of the microprocessor 68. As indicated in FIG. 7, a button 60 optionally located on the remotely accessible security controlled audio link 20, is depressed to in turn commence the operations of the digital alarm dialer 69 of the microprocessor 68 to create a digital signal, serving as a signature signal.

The digital signal, which is transmitted from the digital alarm dialer 69 of the microprocessor 68, is a personalized digital signal, called a signature signal, assigned specifically to the person in the domicile 26, and via telephone lines 40, T.R., and 27 this personalized digital signal reaches the remote monitoring station 42, and specifically reaches this monitoring station's digital signal receiver 44. This receiver 44, which has been used previously and still is used in remote monitoring stations 42, modifies the signal energy and directs it to the monitoring station's computer assembly 74 consisting of the computer 46, and display equipment 48, which all have been used and still are being used in remote monitoring stations 42. Soon the person initiating the alarm has his or her medical history on display for review by a person at the remote monitoring station 42, who preferably is a paramedically trained person. The so called paramedic completes the partially started telephone communication functions to create a hands off duplex telephone communication system 30 with the person in the domicile, providing hands free duplex telephone communications between them.

If medical assistance is needed, medical response personnel at a unit 122 are called. Often an ambulance or other aid vehicle is requested and started on its way. The pertinent medical display information is printed and faxed, by a fax printer 124 to reach the medical response personnel before they leave and/or reach them en route. If there is a fire at the domicile 24, then fire personnel and their vehicles are requested, via the computer operations selected by the personnel at the remote monitoring station 42, and they are immediately dispatched to reach the domicile 24 as soon as possible. If there is need for police protection or other police services, the computer operations, selected by the personnel at the remote monitoring station 42, will request the dispatching of the specialized police personnel, so they may reach the domicile 24 as soon as possible.

If there is no alarm mode of the remotely accessible security controlled audio link 20, nevertheless, a person at a remote telephone location 34 and/or at the remote monitoring station 42, may desire to try to reach the person living in the domicile. This person may be a relative, friend, paramedic, or other person who is concerned for the continued well being of the person living in the domicile 24. This so called check in call, if not answered reasonably promptly by the person living in the domicile 24, after a designated ring count, determined by the ring count module 120, is processed by the microprocessor 68. Via the utilization of a pulse tone and/or pulse tone sequences, and related informative sounds, and the use of the DTMF decoder 70, the person at the remote telephone location 34 is able to cause the partial answering of the domicile telephone by dialing the telephone number, and then after sending the code signals, is further able to complete a hands free duplex telephone communication system 30 between the remote telephone location 34 and the domicile 24. Hopefully, a conversation is started, and if aid is needed, the selected needed persons will be sent to the domicile 24. If no person answers at the domicile 24, a selected person or selected persons will be sent promptly to the domicile 24. When the open telephone line is no longer needed, the person at the remote location can terminate the duplex telephone answering communications.

Figure 10:
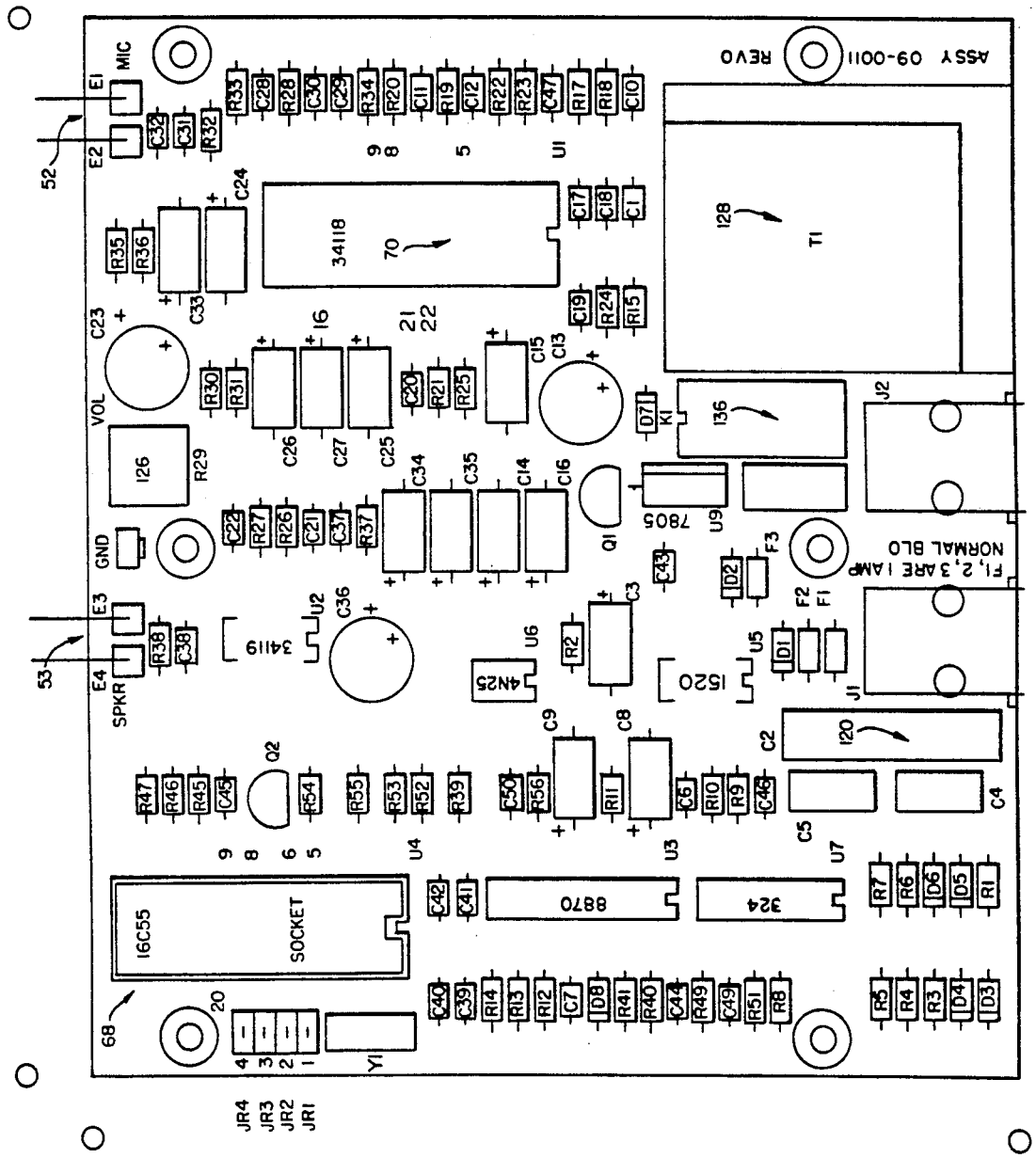

The Physical Arrangement of Components of a Remotely Accessible Security Controlled Audio Link in Respect to a Particular Embodiment Thereof In the schematic view of FIG. 10, the assembled components of a particular preferred embodiment 22 of the remotely accessible security controlled audio link 20, in respect to a particular embodiment thereof, are shown as they appear, after a cover 89 of its speaker-like enclosure 88 has been removed. Throughout this FIG. 10, the electronic industry standard designations of components are printed, including respective symbols and/or outlines thereof. Also in FIG. 10, at selected locations, some of the reference numerals and their lead lines or underlines have been printed to identify specific components previously described. In addition, numerals have been added, such as designating the transformer 108.

Figure 11:
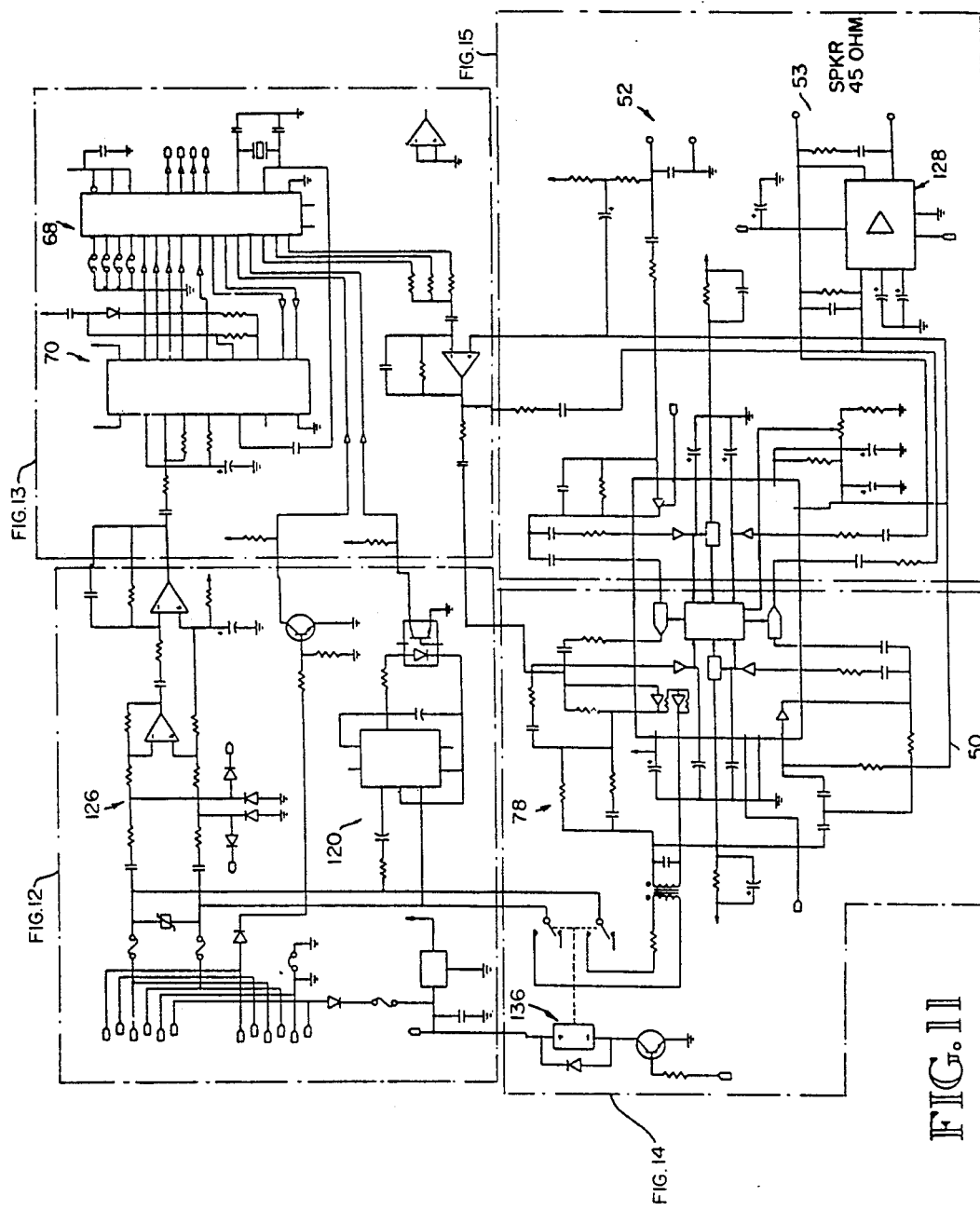
Figure 12:
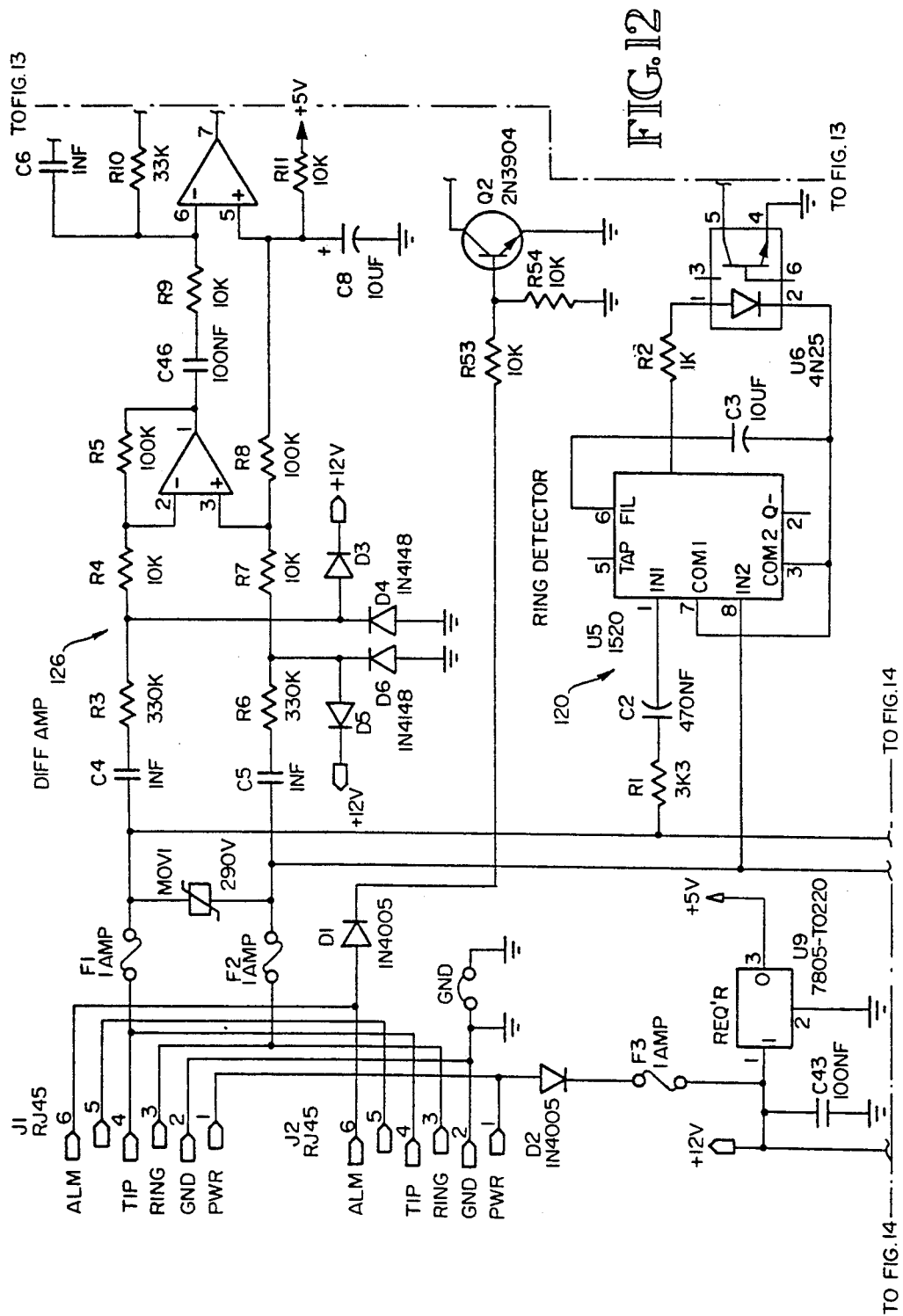
Figure 13:
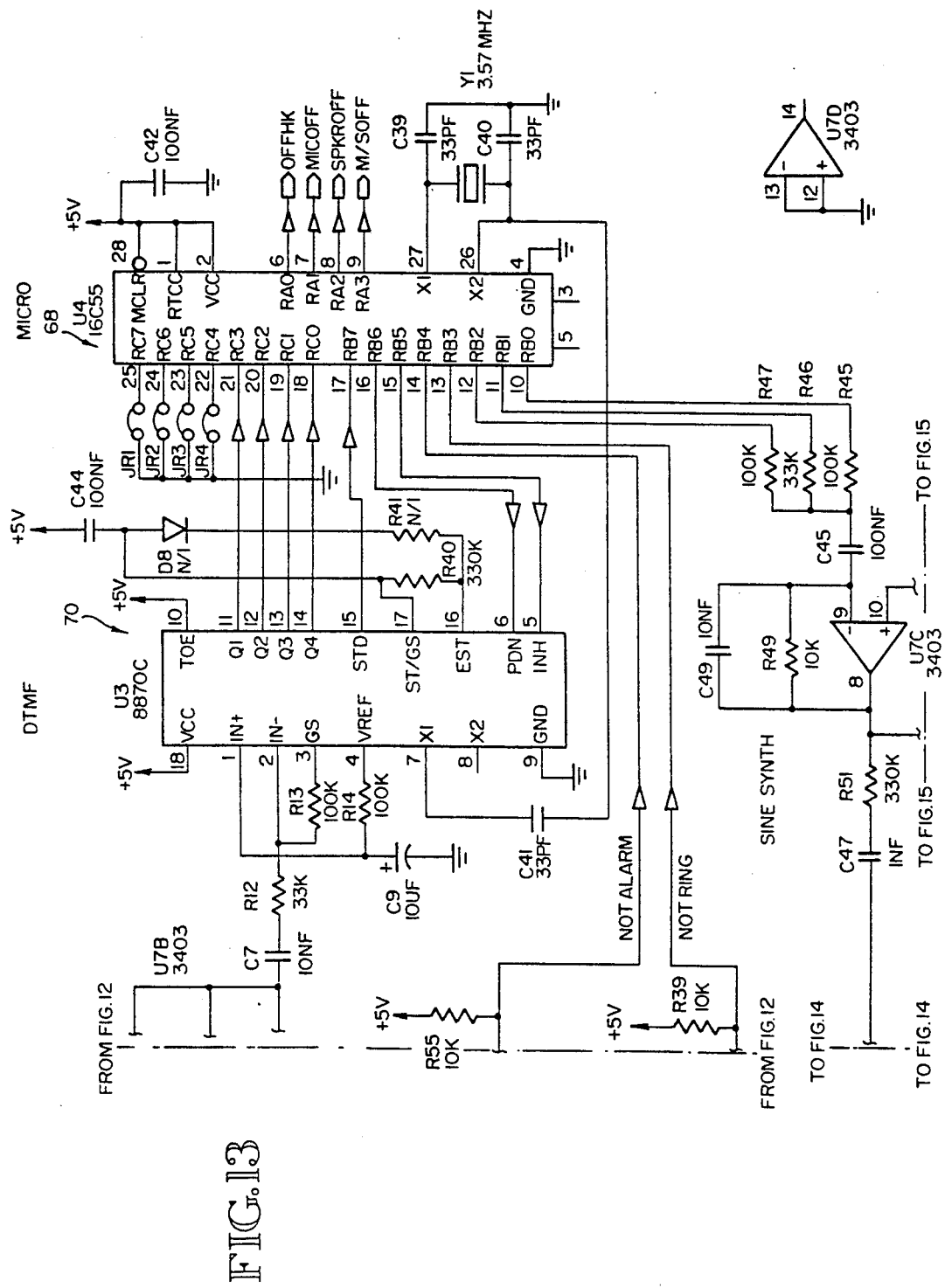
Figure 14:
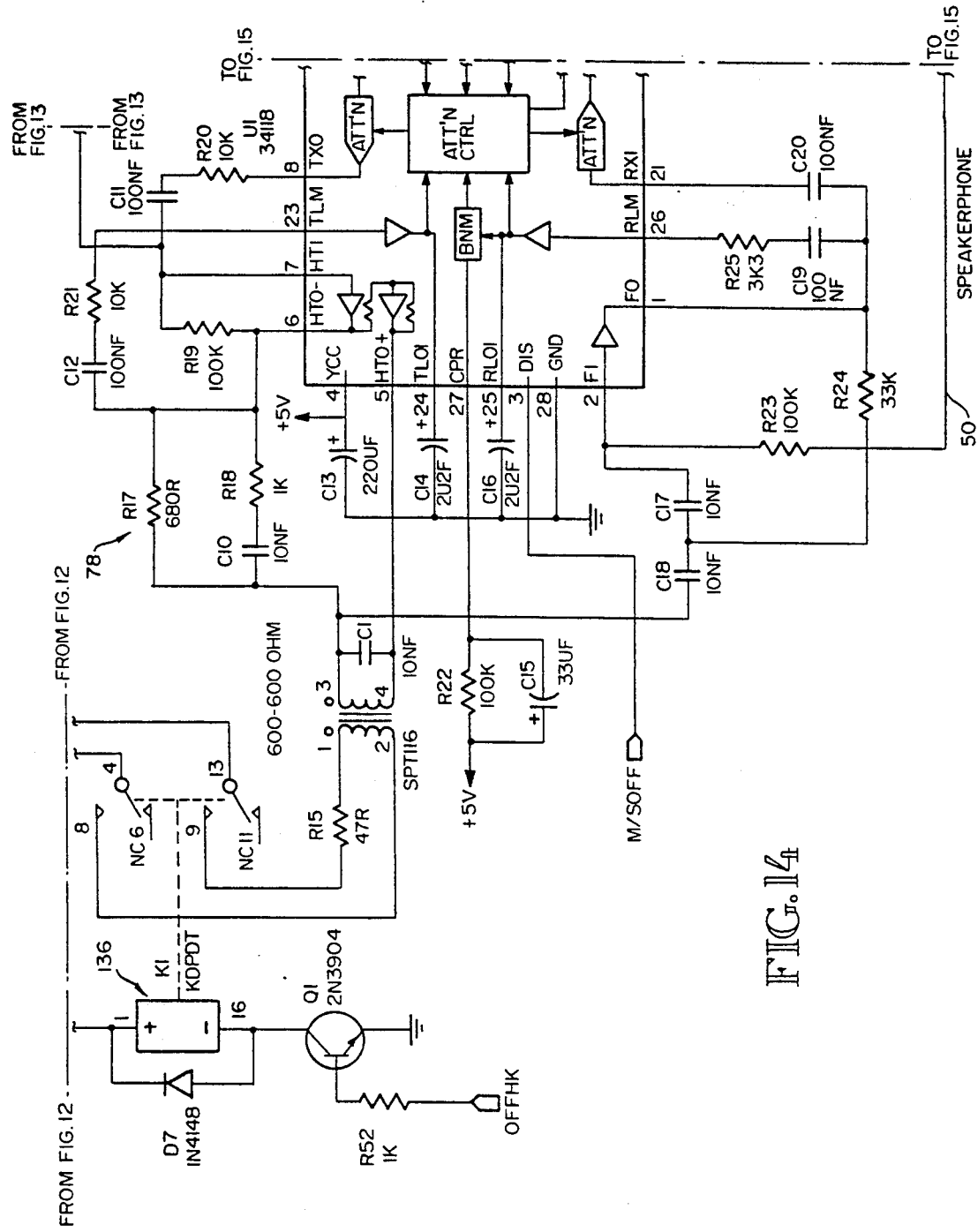
Figure 15:
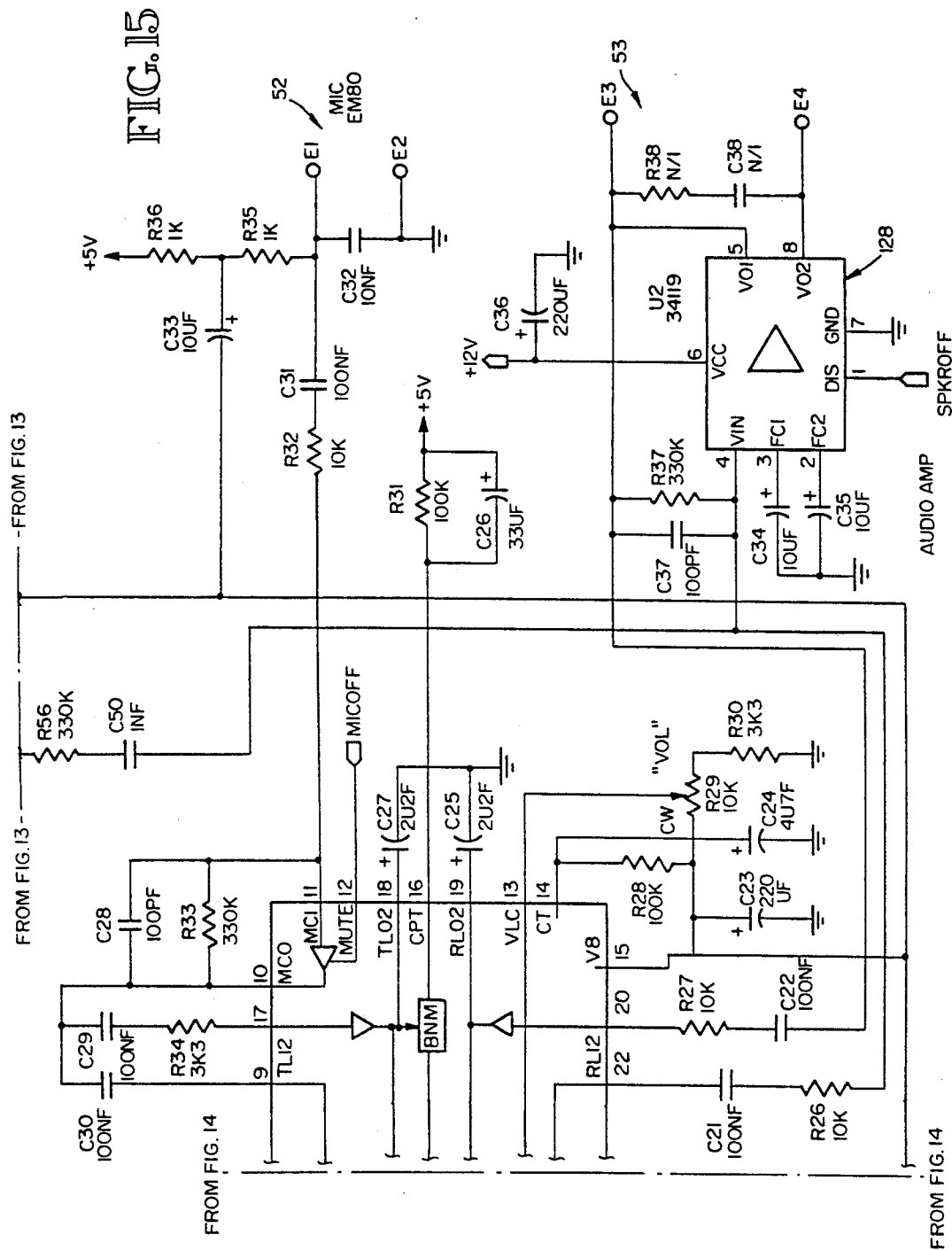

The Circuit Diagram of a Remotely Accessible Security Controlled Audio Link in Respect to a Particular Embodiment Thereof A circuit diagram of a preferred embodiment 22 of the remotely accessible security controlled audio link 20, is shown, by illustrating this circuit diagram completely in FIG. 11, and then enlarged in the interrelated FIGS. 12, 13, 14, and 15. The enlarged interrelated figures are all necessary to reach an overall size large enough to include, in sufficient readable printed size, the electronic industry standard designations of components, inclusive of respective symbols and/or outlines thereof. Also in these FIGS. 11, 12, 13, 14, and 15, at selected locations, some of the reference numerals and their lead lines and underlines have been printed to identify specific components previously described.

In this circuit diagram some of the abbreviations designate the following full terms:

ALM for Alarm

TIP for designating the green wire associated with the telephone being either on or off the hook RING for designating the red wire described as being the advisory line or signal in line GND for ground at twelve volts PWR for the delivery of twelve volts direct current energy In respect to overall consideration of the circuit diagram shown in FIGS. 11, 12, 13, 14, and 15, and also with reference to FIG. 10, and to the block diagram of FIG. 9, the combined use of many previously available and still available components and their related circuitry is illustrated. For example:

a ring detector component and circuitry is used and described as a ring count module 120. Ring detectors are used in telephone answering machines, but are not known to have been used in telephone lines 40 connected to telephone utility lines 27 to be directly involved in placing telephone calls;

a DTMF decoder component 70, also called a dual tone multiple frequency decoder 70 which receives selective pulse codes and selects among them, the respective pulse codes to activate telephone communications, when a proper combination, of the star key or number key, and a numerical key, are depressed on a pulse tone telephone set 36, has been and is used in so called voice mail equipment, for example, for gaining access to a particular telephone line among several being used by a business. However, the use of a DTMF decoder 70 has not been known to have been used to in effect lift up or to hang up a pulse tone conventional telephone 32 in respect to telephone utility lines 27;

VOX equipment 78, also noted as Attenuator Control, and abbreviated as ATT'N CTRL, has been and is used in radio telephone systems in respect to cycles of talk and listen. However, VOX equipment is not generally known to have been used, in conjunction with telephone utility lines 27 or domicile telephone lines 40 in respect to a particular speakerphone; and microprocessors 68 have had and are having limited uses in respect to telephone utility lines 27. For example, they are used in telephone number storing programs of telephone equipment in homes and offices.

In addition to these major components, there are many components used, as illustrated in the overall circuit presented in FIGS. 11, 12, 13, 14, and 15, which have been used and are being used in telephone utility lines 27, such as:

differential amplifier 126, abbreviated as DIFF AMP, which boosts the voltage in reference to an incoming call;

the audio amplifier 128 which increases the sound level of sounds coming from speakers 53; and the speakerphone 50, further supplemented to serve as this remotely accessible security controlled audio link 20, which, when incorporated in the personal emergency response system 54, provides the hands free telephone answering system 30, creating the potential of hands free telephone communications.

Further descriptions regarding these major components and other components, as illustrated in FIGS. 11, 12, 13, 14, and 15, using identifying numbers and letters, which are shown in these figures, follow:

Telephone jack connections on the printed circuit board 132, i.e. PC Board, are equipped with two parallel 6 pin telephone jacks 130. The center two pins carry the phone line pair as usual, and the other pins carry power and alarm signals as shown.

Phone line connections are undertaken, so the phone lines 27, 40, are protected against lightning and fire hazard, by using two fuses and MOV1, before these telephone lines 27, 40 are connected to three circuit shown in FIGS. 11 through 15, as follows:

1. Differential amplifier, U7A etc., circuit 126 to feed the telephone line pulse tones to the touch tone decoder U3, also referred to as the DTMF decoder 70;

2. Ring Detector U5 circuit to detect the ringing signal, which is the circuit of the ring count module 120. Optoisolator feeds this circuit to U4; and 3. Relay K1 contacts of circuit 136 and thence to the transformer T1. These relay contacts are open normally, when the speakerphone 50 is inactivated.

Speakerphone circuit U1 takes the received telephone line audio and drives the loudspeaker amplifier U2, and at the same time amplifies the microphone audio and connects it to the telephone line via the transformer. This circuit U1 also incorporates the "hybrid" circuit which takes the "two wire" telephone signals and converts them to "4 wire". In other words it splits the transmit and receive signals into two pairs.

The main function of the speakerphone 50 is to allow a bidirectional conversation, i.e. a duplex telephone communication to take place without the users being bothered by the effects of feedback, i.e. howls and squeals from the speaker 53 as the microphone 52 picks up the speaker audio and retransmits it. This effect is prevented by sophisticated circuits in this circuit U1, which determine which party is currently speaking, and then turn up the volume for receive and down for transmit, or vice versa, as required.

In respect to microcontroller or microprocessor logic, all signals are fed to the microcontroller U4, designated as a PIC 16C55, which controls all functions under the control of internal "firmware", which may be altered as feature changes require. Note in particular that the microcontroller outputs include controls to:

detect ringing;
answer the phone;
turn on and off the microphone;
turn on and off the speaker; and
turn on and off both microphone and speaker together.

In respect to the tone generator, the circuit comprising U7C forms a sine wave synthesizer, which can generate tones of programmable frequency and duration under microcontroller control. These are fed to the telephone line 40 and to the speaker 53, and allow "user feedback" tone sequences to give beeps and the like to the users.

In respect to the regulator, U9 takes the incoming 12 volts DC and regulates it to 5 volts DC to drive the majority of the circuitry. The 12 VDC feeds the speaker amplifier however, in order to provide a reasonably high speaker volume.

In respect to the differential amplifier circuit 126, U7A monitors the phone line audio at all times, to look for touch tone when another device answers the telephone call. It is connected as a "gain of 0.3" differential amplifier which amplifies signals across the tip and ring, but which rejects any AC "common mode" signals, such as AC 60 Hz hum at 115 VAC, which are common to tip and ring. The 4 diodes protect the amplifier from excessive common mode signals, particularly ringing.

Capacitors C4 and C5 allow only AC to pass. These capacitors are high voltage types, and F1, F2, and MOV 1 are also fitted, to satisfy the requirements of the regulatory agencies.

Amplifier U7B amplifies the differential signals by a gain of 3.3 and passes them to the DTMF decoder.

In respect to the DTMF decoder 70, U3 provides an input gain of 3, and then processes the audio looking for standard touch tone signals. Any digit which is of the required frequency combination and characteristics, and which meets the tone presence duration and absence requirements, causes the STD signal to go high, indicating to the microprocessor or microcontroller 138 that a digit has been received. The digit is presented in binary fashion on U3 signal Q1 through Q4. STD goes low when the touch tone signal stops.

In respect to the ring detector 120, U5 is a TI 1520 ring detector which can detect ringing, over the range 40 to 130 VAC and 17-68 Hz, and which does so in compliance with regulatory requirements. On detection of ringing, pin 4 goes high, to 5 VDC, and activates the optoisolator U6, which in turn informs the microprocessor or microcon ringing is present. The microcontroller 68 performs the desired ring presence and absence timing measurements.

In respect to the microcontroller 68, U4 is a low cost PIC 16C55 which contains internal program and RAM memory. Normally the so-called OTP, one time programmable, type is used. It operates at 3.579545 MHz, the low cost TV colorburst crystal frequency. It has 20 I/O lines configured as shown on the schematic. Unused lines are fitted with jumper options JR1, 2, 3, and 4 to allow future feature option selection.

Signals RB5 and RB6 feed the DTMF decoder 70 INHIBIT and POWERDOWN signals. However these signals are only usable on Mitel type DTMF decoders 70. The present firmware therefore keeps these signals at ground to allow other types of DTMF decoder 70 to be used also.

In respect to the sine wave synthesizer, signals RB0, 1, and 2 feed the sine wave synthesizer U7C. They generate a quasi sine wave. When filtered by U7C, R49, C49, this quasi sine wave signal appears to be similar to a sine wave.

In respect to the speakerphone 50 and speaker or audio amplifier components 128:

Regarding the transformer, audio is fed via the relay contacts to the transformer T1, which has the ability to provide a 1:1 600 ohm impedance match even at high levels of DC telephone line current through the primary. R15 is necessary, depending on the type of transformer used, to ensure that the DC line voltage when off-hook is not too low, either for regulatory approval or for proper operation of other parallel devices, e.g., other extension speakerphones in other rooms, extension telephones, etc.

Regarding the hybrid, U1 pins 5 and 6 provide transmit audio at the same level by 180 degrees out of phase, i.e. differential drive. R17, R18, C1, and C10 are chosen so that at the frequencies of interest, 300-3500 Hz, they equal the reflected impedance of the transformer primary and telephone line 40. Therefore half the power is transmitted to the telephone line 40. Also, because of the equal impedances, transformer pin 3 will have no AC voltage impressed on it. It is exactly halfway between two equal but opposite drives. Therefore pin 3 audio is used for receive, and in theory contains no transmit audio. In practice of course there is not a perfect impedance match and so some transmit audio is reflected back which is called sidetone.

Regarding the receive filter, the receive audio is fed via C17 and C18 to U1 pin 2. This is connected as a two pole high pass filter, 390 Hz, to reject any AC 60 Hz hum that may be present on the receive audio.

Regarding the microphone or audio amplifier 128, the microphone 52 is biased, via R35 and R36, and the audio, at a very low level, less than 1 mV, is fed to U1 pin 11. The audio is amplified by a gain of 33, R33/R32, at pin 10.

Regarding the speaker amplifier 128, U2 is connected as a gain of 33, R37/R26, amplifier, to receive audio from U1 pin 22. It is a differential output amplifier and U2 pins 5 and 8 are of opposite phase, to maximize the audio level. The speaker 53 is normally a 45 Ohm type, although lower values may be used with care.

Regarding the Tx/Rx control, now that the amplifiers have been described, it can be realized that the circuit can control attenuators in each of the two paths. These attenuators have a gain from +6 to −46 dB, depending on the internal control. Furthermore, the sum of the two gains is constant, −40 dB, so that as one gain is increased the other is decreased. In this way audio feedback is prevented. Normally, if neither party is speaking, both attenuators are set to −20 dB. As soon as voice is detected in one or the other direction, one attenuator is changed to +6 and the other to −46 dB. The internal controller determines this by:

Comparing pin 23 of telephone line Tx with pin 26 of telephone line Rx, filtered; and Comparing pin 17 of the amplified Tx microphone signal, with pin 20 of the Rx audio speaker amplifier output.

If both agree on the Tx or Rx supremacy, the attenuators are controlled accordingly. If however the two comparisons disagree, e.g. if both parties are speaking at once, the "fast idle" mode is entered, both at −20 dB, until the comparators agree, when one party stops talking.

The circuit also includes background noise monitors to allow the comparison to be made properly, even if there is a constant noise, e.g. a nearby fan noise, and to allow the comparison to respond slowly, if no party is speaking, "slow idle", or quickly, if both parties are speaking.

Capacitors C14, 16, 25, and 27, control the attack and decay response time of the comparators. C15 and 26 control the attack and decay times of the background noise monitors.

Signal CT on pin 14 can be monitored to see the result of the comparison. If it is at VBIAS, pin 15, the circuit is in idle. If CT is at VBIAS plus 0.24 VDC, then it is in the receive mode. If CT is at VBIAS minus 0.24 VDC, then it is in the transmit mode.

The receive volume is controlled via the DC voltage on VLC pin 13.

Brief Summary Regarding Hands Duplex Free Telephone Communications Made Available by Utilization of the Remotely Accessible Security Controlled Audio Link After installation of a remotely accessible security controlled audio link 20 in a domicile 24, the first security benefit is the creation of a hands free duplex telephone communication system 30 as shown in FIG. 3. The person living in a domicile 24 may select one or more persons, living at a remote domicile or working at a remote office, to be given a coded pulse tone sequence, so they may initiate call into his or her domicile 24, to establish a hands free duplex telephone communication, to determine how the person in the domicile 24 is getting along, and when the conversations end, this person at the remote location can terminate this duplex telephone communication.

If the embodiment of the remotely accessible security controlled audio link 20 is extended further in the functioning thereof, then a person living in the domicile 24, is able to send his or her signature signal to a selected person, to be received by monitoring equipment in his or her remote domicile, to have him or her initiate and terminate the hands free duplex telephone communications as illustrated in FIGS. 1, 2, 4, and 5.

Preferably, as illustrated in FIGS. 6, 7, 8, and 9 of the drawing, the remotely accessible security controlled audio link 20 is extended further in the functioning thereof, whereby a person living in a domicile 24 is able to send his or her signature signal, via telephone lines, to be received upon the operation of communication equipment at a remote monitoring station 42. Thereafter a trained person, often a paramedic, working at this remote monitoring station 42, initiates the hands free duplex telephone communications of the hands free duplex telephone answering system 30, and subsequently learns what assistance or aid the person may require, and, if necessary, then he or she dispatches the selected personnel with their specific equipment and supplies to quickly arrive at the person's domicile 24.

I claim:

1. A method of duplex telephone communicating allowing a person at a remote telephone location to place and to finish, i.e. to initiate and to terminate, a telephone call to person in his or her domicile, and under certain conditions, to turn on or turn off a microphone and/or a loudspeaker in the domicile, so a hands free duplex telephone conversation can take place with the person in the domicile who does not have to lift or to lower a receiver of a telephone set in the domicile, comprising the steps of:

a. arranging a remotely accessible security controlled audio link in a convenient locale in a domicile to be constantly in a listen in mode, after first arranging the components and circuitry thereof by comprising, beforehand, the steps of:

i. providing a ring count module to count the rings, i.e. the shocks, of an incoming call from a telephone utility line to the telephone line of the domicile, and after passing a predetermined number of rings, partially answering the incoming call, as the microphone and loudspeaker remain off;

ii. providing a dual tone multiple frequency decoder to recognize a code signal and react;

iii. providing a microprocessor containing programmable command functions, which are dual tone multiple frequency code enacted;

iv. providing a microphone turned on to aid in completing a partially answered call;

v. providing a speaker turn on to aid in completing a partially answered call;

vi. providing a six position telephone jack, to be connected to an electrical energy supply, to be connected to a telephone line of a domicile and to be connected to any security alarm panel which may also be in a domicile;

vii. providing circuitry interconnecting the telephone jack, ring count module, microprocessor dual tone multiple frequency decoder, microphone and speaker;

whereby, when an incoming telephone call is being received in a domicile, during a normal mode of operations, a person in the domicile may routinely answer the call before a preset number of rings has occurred; however, if the person is not able to timely answer, or is not home to answer, and the ring count is exceeded, then the incoming call is partially answered by the remotely accessible controlled audio link, which is constantly in the listen in mode, via the microprocessor thereof, and the dual tone multiple frequency decoder, via operation of the microprocessor, is activated to further listen for an incoming preselected security dial tone code, initiated by a person at a remote telephone location, and if no security dial tone code timely arrives, these partial telephone call receiving operations are stopped when the microprocessor receives this information from the dual tone multiple frequency decoder, but if the security dial tone code timely arrives, then the dial tone modulated frequency decoder sends this information to the microprocessor, which in turn activates the microphone and speaker, so the telephone call is completed and the person at the remote location is able to continue on to start a hands free duplex telephone communication with a person in the domicile, if he or she is in the domicile and able to hear and to speak, and if no communications are possible, or if a person in the domicile needs help, the person at the remote telephone location makes arrangements, as soon as possible, to assist the person in the domicile and upon completion of the communication, the person placing the telephone call at the remote location, terminates the telephone call connection, which otherwise would remain open, by entering a preselected pulse tone or tones, which are recognized by the remotely accessible security controlled audio link, which operates to, in effect, hang up the receiver, which in reality had never been raised, to place the regular telephone system back into normal operation.

2. A method of duplex telephone communicating, as claimed in claim 1, comprising, in addition, the steps of:
   a. arranging a radio frequency receiver to receive radio frequency energy and to thereafter send a signal to the microprocessor;
   b. arranging circuitry to connect the radio frequency receiver to the microprocessor;
   c. arranging for a radio frequency transmitter to be conveniently carried by a person in a domicile, having a simple touch control to initiate a radio frequency signal to be received by the radio frequency receiver for the delivery thereof to the microprocessor, whereby the microprocessor is operated to send a signature signal over the telephone lines to a preselected remote telephone location for the receiving and reviewing thereof by a person, whereby a telephone call is placed by this person at the remote telephone location back to the person in the domicile, which is answered via hands free duplex telephone communications, and by preceding operations of the microprocessor, the operations of the ring count module and the dual tone multiple frequency decoder are bypassed during this alarm mode of operations of the remotely accessible security controlled audio link, and when the communications are ended, the person at the remote location terminates the duplex telephone call.

3. A method of duplex telephone communication, as claimed in claims 1 or 2 comprising, in addition, the step of arranging an electrical energy supply for the remotely accessible security controlled audio link.

4. A method of duplex telephone communication, as claimed in claims 1 or 2, comprising, in addition, the steps of:
   a. arranging a telephone circuit of a domicile;
   b. connecting this telephone circuit of the domicile to the circuits of a telephone utility; and
   c. connecting this telephone circuit of the domicile to the six position telephone jack of the remotely accessible security controlled audio link.

5. A method of duplex telephone communication, as claimed in claim 1, comprising, in addition, the steps of:
   a. arranging an electrical energy supply for the remotely accessible security controlled audio link;
   b. arranging a telephone circuit of a domicile;
   c. connecting this telephone circuit of the domicile to the circuits of a telephone utility; and
   d. connecting this telephone circuit of the domicile to the six position telephone jack of the remotely accessible security controlled audio link.

6. A method of duplex telephone communication, as claimed in claim 2, comprising, in addition, the steps of:
   a. arranging an electrical energy supply for the remotely accessible security controlled audio link;
   b. arranging a telephone circuit of a domicile;
   c. connecting this telephone circuit of the domicile to the circuits of a telephone utility; and
   d. connecting this telephone circuit of the domicile to the six position telephone jack of the remotely accessible security controlled audio link.

7. A method of duplex telephone communication, as claimed in claim 1, 5, or 6, comprising, in addition, the step of:
   providing an amplifier to improve the effectiveness of the speaker.

8. A method of duplex telephone communication, as claimed in claims 1, 5, or 6, comprising, in addition, the step of:
   providing vox equipment creating attenuator control, fluctuating between the speaker and microphone.

9. A method of duplex telephone communication, as claimed in claims 1, 5, or 6, comprising, in addition, the step of providing a differential amplifier to boost the voltage of an incoming call.

10. A method of duplex telephone communication, as claimed in claims 1, 5, or 6, comprising, in addition, the steps of:
    a. providing an amplifier to improve the effectiveness of the speaker; and
    b. providing vox equipment creating attenuator control, fluctuating between the speaker and the microphone.

11. A method of duplex telephone communications, as claimed in claims 1, 5, or 6, comprising, in addition, the steps of:
    a. providing an amplifier to improve the effectiveness of the speaker;
    b. providing vox equipment creating attenuator control fluctuating between the speaker and the microphone; and
    c. providing a differential amplifier to boost the voltage of an incoming call.

12. A method of duplex telephone communication allowing a person at a remote telephone location to place end to end, i.e. to initiate and to terminate, a telephone call to a person in his or her domicile, and under certain conditions, to turn on a microphone and/or a loudspeaker in the domicile, so a hands free telephone conversation can take place with the person in the domicile, who does not have to lift or to lower i.e. to pick up or to hang up a receiver of a telephone set in the domicile, comprising the steps of:
    a. arranging a remotely accessible security controlled audio link in a convenient locale in a domicile to be constantly in a listen in mode, after first arranging the components and circuitry thereof by comprising, beforehand, the steps of:
       i. providing a ring count module to count the rings, i.e. the shocks, of an incoming call from a telephone utility line to the telephone line of the domicile, and after passing a predetermined number of rings, partially answering the incoming call, as a microphone and speaker remain off;
       ii. providing a dual tone multiple frequency decoder to recognize a code signal and react;

iii. providing a microprocessor containing programmable command functions, which are dual tone multiple frequency code enacted;
iv. providing an amplifier;
v. providing microphone turned on during the completion of a partially answered call;
vi. providing a speaker turned on during the completion of a partially answered call;
vii. providing a six position telephone jack;
viii. providing circuitry interconnecting the telephone jack, ring count module, and the microprocessor; and
ix. providing circuitry interconnecting the ring count module, the dual tone multiple frequency decoder, microprocessor, amplifier, microphone and speaker;

b. arranging an electrical energy supply for the remotely accessible security controlled audio link comprising the steps of:
i. providing an alternating current transformer to reduce utility supplied electrical energy voltage, generally 110 volt AC, down to lower voltage, generally 12 volts AC;
ii. providing a circuit to deliver utility supplied electrical energy from an outlet in a domicile to the alternating current transformer;
iii. providing a low voltage power supply to change low voltage, generally 12 volts AC, into low voltage, generally 12 volts DC;
iv. providing a circuit to deliver the 12 volts AC electrical energy from the alternating current transformer to the low voltage power supply;
v. providing a circuit to deliver 12 volts DC electrical energy from the low voltage power supply to the six position telephone jack of the remotely accessible security controlled audio link; and c. arranging a telephone circuit, extending from a telephone jack in a telephone circuit of a domicile, which is in turn connected to the circuits of a telephone utility, to the six position telephone jack of the remotely accessible security controlled audio link;

whereby, when an incoming telephone call is being received in a domicile, during a normal mode of operations, a person in the domicile may routinely answer the call before a preset number of rings has occurred; however, if the person is not able to timely answer, or is not home to answer, and the ring count is exceeded, then the incoming call is partially answered by the remotely accessible controlled audio link, which is constantly in the listen in mode, via the microprocessor thereof, and the dual tone multiple frequency decoder, via operation of the microprocessor, is activated to further listen for an incoming preselected security dial tone code, initiated by a person at a remote telephone location, and if not security dial tone code timely arrives, these partial telephone call receiving operations are stopped when the microprocessor receives this information from the dual tone multiple frequency decoder, but if the security dial tone code timely arrives, then the dual tone multiple frequency decoder sends this information to the microprocessor, which in turn activates the microphone and speaker, so the person at the remote location is able to continue on to start a hands free duplex telephone communication with a person in the domicile, if he or she is in the domicile and able to hear and to speak, and if no communications are possible, or if a person in the domicile needs help, the person at the remote telephone location makes arrangements, as soon as possible, to assist the person in the domicile and upon completion of the communication, the person placing the telephone call at the remote location terminates the telephone call connection, which otherwise would remain open, by entering a preselected pulse tone or tones, which are recognizable by the remotely accessible security controlled audio link, which operates to, in effect, hang up the receiver, which in reality had never been raised, to place the regular telephone system back into normal operation.

13. A method of duplex telephone communicating, as claimed in claim 12, comprising, in addition, the steps of:
a. arranging a radio frequency receiver to receive radio frequency energy and to thereafter send a signal to the microprocessor;
b. arranging circuitry to connect the radio frequency receiver to the microprocessor;
c. arranging for a radio frequency transmitter to be conveniently carried by a person in a domicile, having a simple touch control to initiate a radio frequency signal to be received by the radio frequency receiver for the delivery thereof to the microprocessor,
whereby the microprocessor is operated to send a signature signal over the telephone lines to a preselected remote telephone location for the receiving and reviewing thereof by a person, whereby a telephone call is placed by this person at the remote telephone location back to the person in the domicile, which is answered via hands free duplex telephone communications, and by preceding operations of the microprocessor, the operations of the ring count module and the dual tone multiple frequency decoder are bypassed during this alarm mode of operations of the remotely accessible security controlled audio link, and when these communications are completed, the person at the remote telephone location terminates this telephone call.

14. A method of duplex telephone communication, as claimed in claims 12 or 13, comprising, in addition, the step of:
providing vox equipment creating attenuator control, fluctuating between the speaker and the microphone.

15. A method of duplex telephone communication, as claimed in claims 12 or 13, comprising, in addition, the step of:
providing an amplifier to improve the effectiveness of the speaker.

16. A method of duplex telephone communication, as claimed in claims 12 or 13, comprising, in addition, the step of:
providing a differential amplifier to boost the voltage of an incoming call.

17. A method of duplex telephone communication, as claimed in claims 12 or 13, comprising, in addition, the steps of:
a. providing vox equipment creating attenuator control, fluctuating between the speaker and the microphone; and
b. providing an amplifier to improve the effectiveness of the speaker.

18. A method of duplex telephone communication, as claimed in claims 12 and 13, comprising, in addition, the steps of:
   a. providing vox equipment creating attenuator control, fluctuating between the speaker and the microphone;
   b. providing an amplifier to improve the effectiveness of the speaker; and
   c. providing a differential amplifier to boost the voltage of an incoming call.

19. A method of duplex telephone communication between a person or persons located at a remote monitoring station and respective persons living in respective domiciles, and in each respective domicile, if necessary, the person living in the domicile, is able to undertake a hands free duplex telephone conversation, because a receiver of a telephone set in the domicile does not have to be lifted or touched in any way, and such hands free duplex telephone conversation cannot be initiated by an outside call, unless a correct preselected security pulse tone control is timely initiated and detected, or unless the person in a domicile who desired to commence such hands free duplex telephone conversation initiates his or her personal signature signal, which is received at the remote monitoring station, and the personal thereof may initiate a return telephone call, which then bypasses the security pulse tone control, and is answerable by the person in the domicile in a hands free duplex telephone conversation, comprising the steps of:
   a. arranging equipment, components, and circuitry of a remote monitoring station upon undertaking the steps of:
      i. providing telephone utility line connections for each person living in a domicile;
      ii. providing a remote telephone and equipment therefore in respect to each person living in a domicile;
      iii. providing a digital signal receiver to monitor any and all incoming personal signature signals of respective persons living in respective domiciles;
      iv. providing a computer to react upon receiving a personal signature signal;
      v. providing medical histories of the persons living in the domiciles;
      vi. providing a display screen for displaying the medical history of a person living in a domicile, as selected from many, upon the directed functioning of the computer, when the person living in a domicile successfully initiates his or her signature signal, which is transmitted over telephone lines from the domicile to the remote monitoring station;
   b. arranging a remotely accessible security controlled audio link in a convenient locale in a domicile to be constantly in a listen in mode, after first arranging the components and circuitry thereof by comprising, beforehand, the steps of:
      i. providing a ring count module to count the rings, i.e. the shocks of an incoming call from a telephone utility line to the telephone line of the domicile, and after passing a predetermined number of rings, partially answering the incoming call, as the microphone and speaker remain off;
      ii. providing a dual tone multiple frequency decoder to recognize a code signal and react;
      iii. providing a microprocesor containing programmable command functions, which are;
      iv. providing an amplifier
      v. providing a microphone turned on during the completion of a partially answered call;
      vi. providing a speaker turned on during the completion of a partially answered call;
      vii. providing a six position telephone jack;
      viii. providing circuitry interconnecting the telephone jack, ring count module, and the microprocessor; and
      ix. providing circuitry interconnecting the ring count module, the dual tone multiple frequency decoder, microprocessor, amplifier, microphone and speaker;
   b. arranging an electrical energy supply for the remotely accessible security controlled audio link, comprising the steps of:
      i. providing an alternating current transformer to reduce utility supplied electrical energy voltage, generally 110 volt AC, down to a lower voltage, generally 12 volts AC;
      ii. providing a circuit to deliver utility supplied electrical energy from an outlet in a domicile to the alternating current transformer;
      iii. providing a low voltage power supply to change low voltage, generally 12 volts AC, into low voltage, generally 12 volts DC;
      iv. providing a circuit to deliver the 12 volts AC electrical energy from the alternating current transformer to the low voltage power supply;
      v. providing a circuit to deliver 12 volts DC electrical energy from the low voltage power supply to the six position telephone jack of the remotely accessible security controlled audio link; and
   c. arranging a telephone circuit, extending from a telephone jack in a telephone circuit of a domicile, which is in turn connected to the circuits of a telephone utility, to the six position telephone jack of the remotely accessible security controlled audio link;
   whereby, when an incoming telephone call is being received in a domicile, during a normal mode of operations, a person in the domicile may routinely answer the call before a selected number of rings has occurred; however, if the person is not able to timely answer, or is not home to answer, and the ring count is exceeded, then the incoming call is partially answered by the remotely accessible controlled audio link, which is constantly in the listen in mode, via the microprocessor thereof, and the dual tone multiple frequency decoder, via operation of the microprocessor, is activated to further listen for an incoming preselected security dial tone code, initiated by a person at a remote telephone location, and if no security dial tone code timely arrives, these partial telephone call receiving operations are stopped when the microprocessor receives this information from the dual tone multiple frequency decoder, but if the security dial tone code timely arrives, then the dual tone multiple frequency decoder sends this information to the microprocessor, which in turn activates the microphone and speaker, so the telephone call is completed and the person at the remote location is able to continue on the start a hands free duplex telephone communication with a person in the domicile, if he or she is in the domicile and able to hear and to speak, and if no communications are possible, or if a person in the domicile needs help, the person at the remote telephone location makes arrangements, as soon as possible, to assist the person in the domicile, and upon completion of the communication, the person placing the telephone call at the remote location, terminates the telephone call connection, which otherwise would remain open, by entering a preselected pulse tone or tones, which are recognized by the remotely accessible security controlled audio link, which operates to, in effect, hang up the telephone receiver, which in reality had never been raised, to place the regular telephone system back into normal operation.

20. A method of duplex telephone communication between a person or persons located at remote monitoring station and respective persons living in respective domiciles, and in each respective domicile, if necessary, the person living in the domicile, is able to undertake a hands free duplex telephone conversation, as claimed in claim 19, comprising, in addition, the steps of:
   a. providing vox equipment creating attenuator control, fluctuating between the speaker and microphone;
   b. providing an amplifier to improve the effectiveness of the speaker; and
   c. providing a differential amplifier to boost the voltage of an incoming call.

21. A remotely accessible security controlled audio link which, when in operation, allows a person at a remote telephone location to place and to terminate a duplex telephone call to a person in his or her domicile, and under certain conditions, to turn on or off a microphone and/or a loudspeaker in the domicile, so a hands free duplex telephone conversation can take place with the person in the domicile, who does not have to lift or replace a receiver of a telephone set in the domicile, comprising:
   a. a housing;
   b. a printed circuit board positioned in the housing having circuits and having mounting places for electrical and electronic components;
   c. a telephone jack having at least six pin capability connected to the circuit board to selected circuits of the printed circuit board, and to receive telephone line connectors of telephone lines of the telephone system components located in the domicile, and to receive electrical energy circuit line connectors of an electrical energy 12 volt DC circuit, which supplies the operating electrical energy needed by this remotely accessible security controlled audio line and to receive alarm triggered signals from ancillary alarm devices;
   d. a ring count module mounted on the printed circuit board and connected to selected circuits of the printed circuit board to detect each ring occuring, when a person at a remote telephone places a telephone call to a person in the domicile, and to send and to receive a signal to and from a microprocessor;
   e. a microprocessor mounted on the printed circuit board to receive and to send signals from and to the ring count module, to send and to receive signals to and form a dual tone multiple frequency decoder, to send and to receive signals to and from a microphone, to send and to receive signals to and from a speaker, to send and to receive signals to open and to close the domicile telephone, and to send and to receive alarm mode signals coming from the telephone jack connected to alarm devices;
   f. a dual tone multiple frequency decoder mounted on the printed circuit board and connected to selected circuit of the printed circuit board to determine, when a correct pulse tone code is received from the remote telephone location, and thereafter send a signal to the microprocessor to in turn activate or deactivate a microphone and/or speaker;
   g. a microphone mounted on the printed circuit board and connected to selected circuits, and to be turned on and off upon receiving signals from the microprocessor; and
   h. a speaker mounted on the printed circuit board and connected to selected circuits, and to be turned on and off upon receiving signals from the microprocessor;
   whereby, in the normal mode of operations of this remotely accessible security controlled audio link, a receiver of a phone set in the domicile may be lifted before a preset number of rings and regular telephone communications may be undertaken; however, if a preset number of rings is exceeded, then the telephone is partially answered, and if during a limited following time, a correct pulse tone code is received from the remote telephone location, then the microphone and/or speaker are turned on, so hands free duplex telephone communications may be carried on or terminated between the person in the domicile and a person located at a remote telephone location, and if no person in the domicile answers, or if a person in the domicile does not answer and needs help, the person at the remote telephone location makes arrangements for someone to assist the person in the domicile, as soon as possible and upon completion of the communication, the person placing the telephone call at the remote location, terminates the telephone call connection, which otherwise would remain open, by entering a preselected pulse tone or tones, which are recognized by the remotely accessible security controlled audio link, which operates to, in effect, hang up the receiver, which in reality had never been raised, to place the regular telephone system back into normal operation.

22. A remotely accessible security controlled audio link, as claimed in claim 21, comprising, in addition:
   a. alarm trigger signal components connected via the telephone jack to the microprocessor and when they are triggered by a person or events in the domicile, the trigger alarm signal created causes the microprocessor to send a signature signal over the telephone lines to a person at a remote telephone locale, so this person at the remote telephone locale can answer by placing a telephone call which is received in the domicile, then during an alarm mode of this remotely accessible security controlled audio link, and at the outset of this alarm mode, the microprocessor operates to bypass the ring count module and the dual tone multiple frequency decoder, and to activate both the speaker and the microphone, so hands free duplex communications can be immediate commenced with the person in the domicile who needs timely assistance.

23. A remotely accessible security controlled audio link, as claimed in claim 21, comprising, in addition:
   a. radio frequency energy receiver connected to the microprocessor; and
   b. a radio frequency energy transmitter having a conveniently arranged depressible control key to be conveniently carried by the person in the domicile, and to be operated to send an alarm signal to the radio frequency energy receiver and beyond to the microprocessor to establish the alarm mode of the remotely accessible security controlled audio link; whereby a signature signal is sent, via operations of the microprocessor, over the telephone lines to a person at a remote telephone locale, so this person at this remote telephone locale can answer by placing a duplex telephone call which is received in the domicile, then during this alarm mode of operations, and at the outset of this alarm mode, the microprocessor operates to bypass the ring count module and the dual tone multiple frequency decoder, and to activate both the speaker and the microphone, so hands free communications can be immediately commenced with the person in the domicile, who needs timely assistance and upon completion of the communication, the person placing the telephone call at the remote location terminates the telephone call connection, which otherwise would remain open, by entering a preselected pulse tone or tone, which are recognized by the remotely accessible security controlled audio link, which operates to, in effect, hang up the receiver, which in reality had never been raised, to place the regular telephone system back into normal operation.

24. A remotely accessible security controlled audio link, as claimed in claim 21, comprising, in addition,
an amplifier to increase the sound produced by the speaker.

25. A remotely accessible security controlled audio link, as claimed in claim 21, comprising, in addition,
vox equipment creating attenuator control, fluctuating between the speaker and microphone.

26. A remotely accessible security controlled audio link, as claimed in claim 21, comprising, in addition,
a differential amplifier to boost the voltage of an incoming call.

27. A remotely accessible security controlled audio link, as claimed in claim 24, comprising, in addition,
vox equipment creating attenuator control, fluctuating between the speaker and the microphone.

28. A remotely accessible security controlled audio link, as claimed in claim 25, comprising, in addition,
a differential amplifier to boost the voltage of an incoming call.

29. A remotely accessible security controlled audio link, as claimed in claim 24, comprising, in addition,
vox equipment creating attenuator control, fluctuating between the speaker and the microphone, and
a differential amplifier to boost the voltage of an incoming call.

30. A remotely accessible security controlled audio link, as claimed in claim 21 comprising, in addition,
a second telephone jack secured to the housing and connected to the circuits of the printed circuit board, in parallel with the other telephone jack, to receive circuit connections extending to another set of a microphone and a speaker.

31. A remotely accessible security controlled audio link, as claimed in claim 21, comprising, in addition,
a twelve volt direct current power supply to receive twelve volt alternating current and convert it to twelve volt direct current, which is conducted to the telephone jack and beyond to the printed circuit and components mounted on the printed circuit board.

32. A remotely accessible security controlled audio link, as claimed in claim 31, comprising, in addition, an alternating current transformer to be connected to a one hundred ten volt electrical circuit in the domicile, and when in operation to produce twelve volt alternating current to be directed, via circuitry, to the twelve volt direct current power supply.

33. A remotely accessible security controlled audio link, as claimed in claims 22 or 23, comprising, in addition, a digital alarm dialer, connected to the microprocessor and to the domicile telephone system, and operated upon the functioning of the microprocessor, which has received an alarm signal from a person in his or her domicile, to dial and to send a digital alarm over the telephone lines to a remote telephone location.

34. A remotely accessible security controlled audio link installed in a domicile, and remote monitoring equipment installed in a remote monitoring station, having telephone line connections between these installations, so a person in a domicile, can, if needed, via hand free duplex telephone communications, talk with a person in the remote monitoring station to seek information, to request help, or to specifically request medical, fire, and/or police services, comprising:

a. remotely accessible security controlled audio link installed in a domicile which, when in operation is constantly in the listen in mode, allows a person at a remote telephone location to place a telephone call to a person in his or her domicile, and under certain conditions, to turn on or turn off a microphone and/or a loudspeaker in the domicile, so a hands free duplex telephone conversation can take place with the person in the domicile, who does not have to lift or to lower a receiver of a telephone set in the domicile, comprising, in turn;

i. a housing;

ii. a printed circuit board positioned in the housing having circuits and having mounting places for electrical and electronic components;

iii. a telephone jack having at least six pin capability connected to the circuit board to selected circuits of the printed circuit board, and to receive telephone line connectors of telephone lines of the telephone system components located in the domicile, and to receive electrical energy circuit line connectors of an electrical energy 12 volt DC circuit, which supplies the operating electrical energy needed by this remotely accessible security controlled audio link, and to receive alarm triggered signals from ancillary alarm devices;

iv. a ring count module mounted on the printed circuit board and connected to selected circuits of the printed circuit board to detect each ring occurring, when a person at a remote telephone places a telephone call to a person in the domicile, and to send and to receive a signal to and from a microprocessor;

v. a microprocessor mounted on the printed circuit board to receive and to send signals from and to the ring count module, to send and to receive signals to and from a dual tone multiple frequency decoder, to send and to receive signals to and from a microphone, to send and to receive signals to and from a speaker, to send and to receive signals to open and to close the domicile telephone line, and to send and to receive alarm mode signals coming from the telephone jack connected to alarm devices;

vi. a dual tone multiple frequency decoder mounted on the printed circuit board and connected to selected circuits of the printed circuit boar to determined, when a correct pulse tone code is received from the remote telephone location, and thereafter send a signal to the microprocessor to in turn activate or deactivate a microphone and/or speaker;

vii. a microphone mounted on the printed circuit board and connected to selected circuits, and to be turned on and off upon receiving signals from the microprocessor; and viii. a speaker mounted on the printed circuit board and connected to selected circuits, and to be turned on and off upon receiving signals from the microprocessor;

whereby, in the normal mode of operations of this remotely accessible security controlled audio link, a receiver of a phone set in the domicile may be lifted before a preset number of rings and regular telephone communications may be undertaken; however, if a preset number of rings is exceeded, then the telephone is partially answered, and if during a limited following time, a correct pulse tone code is received from the remote telephone location, then the microphone and/or speaker are turned on, so hands free duplex telephone communications may be carried on or terminated between the person in the domicile and a person located at a remote telephone location, and if no person in the domicile answers, or if a person in the domicile does answer and needs help, the person at the remote telephone location makes arrangements for someone to assist the person in the domicile, as soon as possible and upon completion of the communication, the person placing the telephone call at the remote location, terminates the telephone call connection, which otherwise would remain open, by entering a preselected pulse tone or tones, which are recognized by the remotely accessible security controlled audio link, which operates to, in effect, hang up the receiver, which in reality had never been raised, to place the telephone system back into normal operations; and b. remote monitoring station equipment, components, and circuitry, comprising, in turn:

i. telephone utility line connections for each respective person living in a domicile and requesting monitoring services;

ii. remote telephones and related telephone equipment for serving each of these respective persons living in domiciles;

iii. a digital signal receiver to monitor any and all incoming personal signature signals of all respective persons living in their respective domiciles;

iv. a computer to react upon receiving a personal signature signal from the digital signal receiver;

v. a display screen for displaying the respective medical history of a respective person living in a respective domicile, such display resulting from operations of the computer.

35. A remotely accessible security controlled audio link installed in a domicile, and remote monitoring equipment installed in a remote monitoring station, as claimed in claim 34, comprising, in addition:

alarm trigger signal components connected via the telephone jack to the microprocessor and when they are triggered by a person or events in the domicile, the trigger alarm signal created causes the microprocessor to send a signature signal over the telephone lines to a person at a remote telephone locale, so this person at the remote telephone locale can answer by placing a telephone call which is received in the domicile then during an alarm mode of this remotely accessible security controlled audio link, and at the outset of this alarm mode, the microprocessor has operated to bypass the ring count module and the dual tone multiple frequency decoder, and to activate both the speaker and the microphone, so hands free duplex communications can be immediately commenced with the person in the domicile who needs timely assistance.

36. A remotely accessible security controlled audio link installed in a domicile, and remote monitoring equipment installed in a remote monitoring station, as claimed in claim 34, comprising, in addition:

a. radio frequency energy receiver connected to the microprocessor; and b. a radio frequency energy transmitter having a conveniently arranged depressible control key to be conveniently carried by the person in the domicile, and to be operated to send an alarm signal to the radio frequency energy receiver and beyond to the microprocessor to establish the alarm mode of the remotely accessible security controlled audio link;

whereby a signature signal is sent, via operations of the microprocessor, over the telephone lines to a person at a remote telephone locale, so this person at this remote telephone locale can answer by placing a duplex telephone call which is received in the domicile, then during this alarm mode of operations, and at the outset of this alarm mode, the microprocessor has operated to bypass the ring count module and the dial tone modulated frequency decoder, and to activate both the speaker and the microphone, so hands free communications can be immediately commenced with the person in the domicile, who needs timely assistance and upon completion of the communication, the person placing the telephone call at the remote location terminates the telephone call connection, which otherwise would remain open, by entering a preselected pulse tone or tones, which are recognized by the remotely accessible security controlled audio link, which operates to, in effect, hang up the receiver, which in reality had never been raised, to place the regular telephone system back into normal operation.

37. A remotely accessible security controlled audio link installed in a domicile, and remote monitoring equipment installed in a remote monitoring station, as claimed in claims 35 or 36, comprising in addition, a digital alarm dialer, connected to the microprocessor and to the domicile telephone system, and operated upon the functioning of the microprocessor, which has received an alarm signal from a person in his or her domicile, to dial and to send a digital alarm over the telephone lines to a remote telephone location.

38. A remotely accessible security controlled audio link installed in a domicile, and remote monitoring equipment installed in a remote monitoring station, as claimed in claim 34, wherein the remotely accessible security controlled audio link, comprises, in addition:

an amplifier to increase the sound produced by the speaker.

39. A remotely accessible security controlled audio link installed in a domicile, and remote monitoring equipment installed in a remote monitoring station, as claimed in claim 34, wherein the remotely accessible security controlled audio link, comprises, in addition:
   vox equipment creating attenuator control, fluctuating between the speaker and the microphone.

40. A remotely accessible security controlled audio link installed in a domicile, and remote monitoring equipment installed in a remote monitoring station, as claimed in claim 34, wherein the remotely accessible security controlled audio link, comprises, in addition:
   a differential amplifier to boost the voltage of an incoming call.

41. A remotely accessible security controlled audio link installed in a domicile, and remote monitoring equipment installed in a remote monitoring station, as claimed in claim 34, wherein the remotely accessible security controlled audio link, comprises, in addition:
   a. an amplifier to increase the sound produced by the speaker, and
   b. vox equipment creating attenuator control, fluctuating between the speaker and the microphone.

42. A remotely accessible security controlled audio link installed in a domicile, and remote monitoring equipment installed in a remote monitoring station, as claimed in claim 34, wherein the remotely accessible security controlled audio link, comprises, in addition:
   a. an amplifier to increase the sound produced by the speaker;
   b. vox equipment creating attenuator control, fluctuating between the speaker and the microphone; and
   c. a differential amplifier to boost the voltage of an incoming call.

43. A remotely accessible security controlled audio link installed in a domicile, and remote monitoring equipment installed in a remote monitoring station, as claimed in claim 34, wherein the remotely accessible security controlled audio link, comprises, in addition:
   a second telephone jack connected to the circuit board, in parallel with the other telephone jack to receive circuit connections extending to another set of a microphone and a speaker.

44. A remotely accessible security controlled audio link installed in a domicile, and remote monitoring equipment installed in a remote monitoring station, as claimed in claim 38, wherein the remotely accessible security controlled audio link, comprises, in addition:
   a twelve volt direct current power supply, for the remotely accessible security controlled audio link, to receive twelve volt alternating current and convert it to twelve volt direct current, which is conducted to the telephone jack and beyond to the printed circuit and components mounted on the printed circuit board.

45. A remotely accessible security controlled audio link installed in a domicile, and remote monitoring equipment installed in a remote monitoring station, as claimed in claim 34, wherein the remotely accessible security controlled audio link, comprises, in addition:
   an alternating current transformer, for the remotely accessible security controlled audio link, to be connected to a one hundred ten volt electrical circuit in the domicile, and when in operation to produce twelve volt, alternating current to be directed, via circuitry, to the twelve volt direct current power supply.

46. A remotely accessible security controlled audio link which, when in operation, allows a person at a remote telephone location to place a telephone call to a person in his or her domicile, and under certain conditions, to turn on a microphone and a loudspeaker in the domicile, so a hands free telephone conversation can take place with the person in the domicile, who does not have to lift a receiver of a telephone set in the domicile, comprising:
   a. a printed circuit board;
   b. a six pin telephone jack secured to the printed circuit board, the center two pins carry the telephone line, two pins carry the electrical power, and two pins carry alarm signals;
   c. lightning protection assembly of two fuses and MOV1 mounted on the circuit board to protect the telephone line, and then the telephone line is fed to three circuits;
   d. one, a differential amplifier circuit U7A to feed the telephone line tones to a dual tone multiple frequency decoder U3, printed and mounted on the printed circuit board;
   e. two, a ring detector circuit U5 to detect the ringing signal having an optoisolator which feeds this circuit, to a microprocessor U4, printed and mounted on the printed circuit board;
   f. three, a relay contact circuit K1, continuing on to the transformer T1, having the relay contacts of this circuit K1 normally open when the speakerphone is inactivated printed on the printed circuit board;
   g. a speakerphone circuit U1 printed and mounted on the circuit board and connected to the relay contact circuit K1, to receive telephone line audio, to drive the loudspeaker amplifier U2, and at the same time to amplify the microphone audio and to connect it to the telephone line via the transformer, and having a hybrid circuit to take the two wire telephone signals, and to convert them into four wire signals, thereby splitting the transmit and receive telephone signals into two pairs, thereby allowing bi-directional telephone conversations to take place without the persons using the telephone system being bothered by the effects of feedback such as howls and squeals from the speaker as the microphone picks up the speaker audio and retransmits it, as the overall circuit U1 includes circuitry which determines which person is currently speaking, and then turns up the volume for receive and turns down the volume for transmit, or vice versa;
   h. microprocessor U4, mounted on the printed circuit board also referred to as microcontroller logic UL, to receive all signals and to control all functions, under the control of internal firmware, and the microprocessor outputs include controls to detect ringing, answer the telephone, turn on and off the microphone, turn on and off the speaker, and turn on and off both the microphone and speaker together;
   i. tone generator circuit U7C, printed on the printed circuit board, forms a sine wave synthesizer to generate tones of programmable frequency and duration under the control of the microprocessor U4, which are fed to the telephone line and to the speaker, to allow the persons using the telephone lines to hear feedback tone sequences, which give beep sounds and other like informative sounds;

j. a regulator circuit U9, printed on the printed circuit board, to take incoming twelve volt direct current and to reduce it to five volt direct current to drive the majority of the circuitry, except twelve volt direct current always feed the speaker amplifier to provide a reasonably high speaker volume;

k. a differential amplifier circuit U7A mounted and printed on the printed circuit board to monitor audio at all times to search or to look for touch tone when another device answers the telephone call, connected as a gain of 0.3 to amplify signals across the tip and ring of the telephone jack, and to reject any alternating common mode signals, such as alternating current 60 Hz hum at 115 volts alternating current, which are common to tip and ring signals, and having four dioxides to protect the amplifier from excessive common mode signals, particularly ringing, and having high voltage capacitors C4 and C5 to allow only alternating current to pass, and having fuses F1, F2 and MOV1 to protect against lightning and to thereby satisfy regulatory agency requirements, and having an amplifier U7B to amplify differential signals by a gain of 3.3, and then pass these signals to the dual tone multiple frequency decoder;

l. a dual tone multiple frequency decoder, called a DTMF decoder, mounted and printed on the printed circuit board and designated by U3, to provide an input gain of three, and then to process the audio to look or to search for standard touch tone signals, whereby any touch tone signal digit, which is of the required frequency combination and characteristics, and which meets the tone presence duration and absence requirements, then causes the STD signal to go high, indicating to the microprocessor that a signal digit has been received, and presented in binary fashion on DTMF decoder U3 as a signal at Q1, Q2, Q3, or Q4, and the STD signal goes low when the touch tone signal stops;

m. ring detector circuit or module U5 mounted and printed on the printed circuit board, to detect ringing over the range of forty to one hundred thirty volts alternating current, and over a range of seventeen to sixty eight Hz in compliance with regulatory requirements, and on the detection of ringing, pin four goes high to five volts direct current and activates the optoisolator U6, of this ring detector circuit U5, which in turn informs the microprocessor U4 that ringing is present, and then the microprocessor performs the desired ring presence and absence timing measurements;

n. sine wave synthesizer U7C, mounted and printed on the printed circuit board to generate quasi sine wave tones;

o. transformer T1, mounted and printed on the printed circuit board, to receive the audio of the telephone line, via the K1 relay contacts, to provide a one to one six hundred ohm impedance match even at high levels of direct current telephone line current through the primary, having a resistor 15 to ensure the direct current line voltage, when the telephone is off the hook is not too low, either for regulatory approval or for proper operation of other parallel connected speakerphones in other rooms, or extension telephones;

p. hybrid circuit U1 mounted and printed on the printed circuit board providing attenuator control and referred to as VOX to fluctuate between the speaker and the microphone, having pins 5 and 6 to provide transmit audio at the same level but one hundred and eighty degrees out of phase, referred to as a differential drive, and having resistors 17 and 18, and capacitors 1 and 10 to equal the reflected impedance of the transformer primary and the telephone line at the frequencies of interest in the range of three hundred to thirty five hundred Hz, whereby one half of the power is transmitted to the telephone line, and having a transformer pin 3 which will have no alternating current voltage impressed upon it, being exactly halfway between two equal but opposite drives, and therefore pin 3 is used to receive, and in theory contains no transmitting audio, but may in practice, in the absence of a perfect impedance match, transmit audio which is reflected back as a side tone;

q. a receive filter, mounted and printed on the printed circuit board, in respect to the VOX, receiving audio, via condensers 17 and 18, en route to pin 2 of hybrid circuit U1, is connected as a two pole high pass filter, at three hundred ninety Hz, to reject any alternating current sixty Hz hum present on the receive audio;

r. a microphone amplifier circuit, mounted and printed on the printed circuit board, biased, via resistors 35 and 36, feeds the audio, at a very low level, less than one millivolt, to the hybrid circuit U1 at pin 11, then the audio is amplified by a gain of thirty three by resistors 32, 33 at pin 10 of the hybrid circuit U1;

s. a speaker amplifier circuit U2, mounted and printed on the printed circuit board, connected as a gain of thirty three amplifier, via resistors 26 and 37, receives audio from pin 22 of hybrid circuit U1, having a differential output with pins 5 and 8 of opposite phase, to maximize the audio level, and the connected speaker is normally rated as forty five ohms; and t. Tx/Rx control circuits, mounted and printed on the printed circuit board, associated with the hybrid circuit U1 and the VOX performance, controls attenuators in each of two paths, and each attenuator has a gain capacity or range from +6 to −46 dB, depending on the internal control, with the sum of the two gains being the constant of −40 dB, so as the gain of one path is increased, the gain of the other path is decreased, thereby preventing audio feedback, whereby, normally if neither party is speaking, both attenuators are set to −20 dB, and as soon as a voice is detected in one or the other direction, one attenuator is changed to +6 dB, and the other attenuator is changed to −46 dB, and the internal controller determines this by:

comparing pin 23 of the telephone line Tx with the pin 26 of the filtered telephone line Rx; and comparing pin 17 of the amplified Tx microphone signal with pin 20 of the Rx audio speaker amplifier output; and if both agree on the Tx or Rx supremacy, the attenuators are controlled accordingly. If however the two comparisons disagree, indicating both persons are speaking at once, then a fast idle mode is entered with both attenuators being at −20 dB, until the comparators agree, when one person stops talking; and this Tx/Rx control circuit has noise monitors to allow the comparisons to be made properly, even if there is a constant noise in the background such as fan noise, and to allow the comparisons to respond slowly if no person is speaking at what is termed slow idle, and to allow the comparisons to respond quickly if both person are speaking; and this Tx/Rx control circuit has capacitors, C14, C16, C25, and C27, which control the attack and decay response time of the comparators, and capacitors C15 and C26 which control the attack and decay times of the background noise monitors; and in this Tx/Rx control circuit the signal CT on pin 14 is monitored to see the result of the comparison, noting: that if signal CT is a VBIAS at pin 15, this circuit is in idle; if signal CT is at VBIAS plus 0.24 volts direct current, then this circuit is in the receive mode; and if signal CT is at VBIAS minus 0.24 volts direct current, then this circuit is in the transmit mode; and in this Tx/Rx control circuit, the receive volume is controlled via the direct voltage on VLC pin 13.

* * * * *